(12) United States Patent
Heldeis

(10) Patent No.: US 11,860,801 B2
(45) Date of Patent: Jan. 2, 2024

(54) METHOD FOR IMPLICIT ADDRESSING OF ELECTRONIC UNITS AND CORRESPONDING UNITS

(71) Applicant: Christoph Heldeis, Munich (DE)

(72) Inventor: Christoph Heldeis, Munich (DE)

(*) Notice: Subject to any disclaimer, the term of this patent is extended or adjusted under 35 U.S.C. 154(b) by 225 days.

(21) Appl. No.: 17/422,681

(22) PCT Filed: Jan. 15, 2019

(86) PCT No.: PCT/EP2019/050937
§ 371 (c)(1),
(2) Date: Jul. 13, 2021

(87) PCT Pub. No.: WO2020/147931
PCT Pub. Date: Jul. 23, 2020

(65) Prior Publication Data
US 2022/0114119 A1    Apr. 14, 2022

(51) Int. Cl.
*G06F 12/02* (2006.01)
*G06F 13/16* (2006.01)
*G06F 3/14* (2006.01)

(52) U.S. Cl.
CPC ............ *G06F 13/1668* (2013.01); *G06F 3/14* (2013.01)

(58) Field of Classification Search
CPC ............................... G06F 13/1668; G06F 3/14
See application file for complete search history.

(56) References Cited

U.S. PATENT DOCUMENTS

| | | | |
|---|---|---|---|
| 4,418,386 A | 11/1983 | Vrielink | |
| 4,590,468 A | 5/1986 | Stieglitz | |
| 4,914,437 A * | 4/1990 | Kibrick | H03M 1/308 341/11 |
| 6,684,362 B1 * | 1/2004 | Currier | G06F 13/4291 714/758 |

(Continued)

FOREIGN PATENT DOCUMENTS

| | | |
|---|---|---|
| EP | 0 119 039 A2 | 9/1984 |
| EP | 1 455 278 A1 | 9/2004 |

(Continued)

OTHER PUBLICATIONS

International Search Report (three pages) dated Jul. 22, 2019 from corresponding PCT Application No. PCT/EP2019/050937.

(Continued)

*Primary Examiner* — Cheng Yuan Tseng
(74) *Attorney, Agent, or Firm* — Crowell & Moring LLP

(57) ABSTRACT

A method for implicit addressing includes providing within a first unit and a second unit respectively a counter unit, a comparison unit and a storing unit for the storage of an identifier, allocating a first identifier to the first unit, allocating a second identifier to the second unit setting the same counter value in the counter units of both units, after setting the counter values comparing the counter value in the first unit to the first identifier and comparing the counter value in the second unit to the second identifier, based on equality of the comparison in the first unit sending of first data from the first unit or-assigning of first data to the first unit, based on inequality of the comparison in the second unit no sending or assigning of data to the second unit, and counting up or down the counter value in both units.

11 Claims, 12 Drawing Sheets

(56) References Cited

U.S. PATENT DOCUMENTS

| | | | |
|---|---|---|---|
| 7,519,753 B2* | 4/2009 | Misawa | H04L 12/403 |
| | | | 710/110 |
| 9,007,951 B2* | 4/2015 | Reidl | H04L 25/4904 |
| | | | 370/252 |
| 2014/0226449 A1 | 8/2014 | Fussinger et al. | |
| 2022/0114119 A1* | 4/2022 | Heldeis | H05B 47/18 |
| 2022/0156222 A1* | 5/2022 | Heldeis | G06F 13/4282 |

FOREIGN PATENT DOCUMENTS

| | | | | |
|---|---|---|---|---|
| GB | 2074819 A | | 11/1981 | |
| TW | 201800883 A | * | 1/2018 | G01D 18/008 |
| WO | 2013/064867 A1 | | 5/2013 | |

OTHER PUBLICATIONS

Written Opinion (seven pages) dated Jul. 22, 2019 from corresponding PCT Application No. PCT/EP2019/050937.
U.S. Appl. No. 17/422,666, filed Jul. 13, 2021.
U.S. Appl. No. 17/422,701, filed Jul. 13, 2021.
U.S. Appl. No. 17/422,804, filed Jul. 14, 2021.

* cited by examiner

METHOD FOR IMPLICIT ADDRESSING OF ELECTRONIC UNITS AND CORRESPONDING UNITS

This application is a national application based on Patent Cooperation Treaty Patent Application No. PCT/EP2019/050937, filed on Jan. 15, 2019, the entire contents of which are incorporated herein by reference.

FIELD OF INVENTION

The invention generally relates to a method for implicit addressing of electronic units.

The invention relates more specifically to electronic units that are operated on bus wires. Furthermore, the invention relates to corresponding units and to a group of units.

BACKGROUND OF INVENTION

In most application cases in computer industry explicit addressing is used, i.e. using an address data bus and a data bus. Accordingly digital memories and processors also have address pins and data pins. A special case of explicit addressing is the use of multiplexing of address data and other data, i.e. commands, user data, etc.

SUMMARY OF THE INVENTION

A method for implicit addressing of electronic units for data transmission is given, including:
 providing within a first unit and within a second unit respectively a counter unit, a comparison unit and a storing unit for the storage of an identifier,
 allocating a first identifier to the first unit,
 allocating a second identifier that is different from the first identifier to the second unit,
 setting the same counter value in the counter units of both units,
 after setting the counter values comparing the counter value in the first unit to the first identifier and comparing the counter value in the second unit to the second identifier,
 based on equality of the comparison in the first unit sending of first data from the first unit or assigning of first data to the first unit,
 based on inequality of the comparison in the second unit no sending of data or assigning of data to the second unit, and
 counting up or down the counter value in both units.

Furthermore, there are corresponding units given, e.g. a bus unit and a bus control unit and a group of units.

DESCRIPTION OF GENERAL EMBODIMENTS

It is an object of the invention to give a method for implicit addressing. The method should preferably be easy to implement, especially using only hardware, i.e. no processors nor software. Furthermore, the method should preferably allow a very fast read access and/or write access to the units that are involved. Furthermore, a corresponding group of units, a unit and a control unit have to be given.

These problems are solved by one or more of the methods and by one or more of the units described in the Specification. The method for implicit addressing of electronic units for data transmission includes:
 providing within a first unit and within a second unit respectively a counter unit, a comparison unit and a storing unit for the storage of an identifier or address,
 allocating a first identifier to the first unit,
 allocating a second identifier that is different from the first identifier to the second unit,
 setting the same counter value in the counter units of both units,
 after setting the counter values comparing the counter value in the first unit to the first identifier and comparing the counter value in the second unit to the second identifier,
 based on equality of the comparison in the first unit sending of first data from the first unit or assigning of first data to the first unit, i.e. no sending nor assigning of data,
 based on inequality of the comparison in the second unit no sending of data or assigning of data to the second unit, and
 counting up or down the counter value in both units.

Although the units have identifiers that may also be regarded as a kind of address there are read and write access that do not use these identifiers or addresses explicitly. This allows using buses that do not have address lines and that do not use multiplexing of address data and other data either. Moreover, no bus is necessary any more.

It is possible to use the implicit addressing after some preparation work that may involve the transmission of address data. However, after that preparation it is possible to read data from several units or to write data to several units without giving addresses any more. Each unit counts up for instance and knows from the counter value when it is its turn for access of data.

A further technical effect is that the transmitted user data does not to have to include addresses, for instance destination address and source address. Therefore, there is no overhead in data transmission compared for instance to the internet protocol IP.

It is possible to implement the method using hardware only. This allows having very fast data transmission speeds, for instance more than 10 Mbit/second or even higher. Furthermore, counting and comparing are operations that can be performed using registers and simple electronic circuits.

The first counter value may be different from zero or one, i.e. the access may be performed starting with other units than the first unit. This allows access to only a part of the units. Nevertheless more than one unit can be accessed using the implicit addressing method that is proposed here.

The method may further include:
 after counting up or down comparing the counter value in the first unit to the first identifier and comparing the counter value in the second unit to the second identifier,
 based on inequality of the comparison in the first unit no sending of data from the first unit or no assigning of data to the first unit,
 based on equality of the comparison in the second unit sending of second data or assigning of second data as data that is dedicated to the second unit.

This means that the same steps are performed in all units allowing the production of a single version of the units. Moreover, the steps remain the same independent of the number of units that are involved. There may preferably be further counting up or down of the counter value in both units in order to make read or write access to further units.

There may be at least 10, at least 100 or at least 1000 units. Even if there are one thousand and more units, the speed of reading is so high that it is possible to read or write all these units within milliseconds because no address data has to be transmitted after a preparation phase for block/bulk reads and block/bulk writes. The maximal number of units involved depends on the application and may be for instance less than 10 thousand or less than 100 thousand units. If speed limits occur it is possible to use a plurality of the methods in parallel, i.e. to have several groups of units.

Therefore the method may include:
providing a counter unit, a comparison unit and a storing unit for storing an identifier in all units,
allocating unique identifiers to all units,
setting the same counter value in all units.

Preferably at least 20 percent, at least 50 percent or all units may send data or may assign data as data that is dedicated to the respective unit without intermediate setting of the same counter values for the units, i.e. without intermediate transmission of address data to the units or from the units. The method is more effective and more efficient if a plurality of units is involved in reading or writing of data.

Before counting up or down it may be communicated that only a part of the units shall send data or shall assign data, especially by transmitting an end value for the counter value or by transmitting a data value that stands for the number of units that shall send data or that shall assign data. Therefore, all units know when the block access has to be finished. Furthermore, there may be a mechanism in all units that allows the last unit involved to detect this fact. The last unit may send a special command that shows all other units and also a control unit that the bulk/block access was successful and that the next command may be processed by the units.

Before counting up or down, it may be further or alternatively communicated to the units that the units have to only send data. This relates to a read access especially a bulk read access to one part of the units or to all units. This makes synchronization and clock recovery from transmitted data much easier compared to the third alternative mentioned below.

According to a second alternative, it is possible before counting up or down to communicate that the units shall only assign data. This relates to a write access especially a bulk write access to one part of the units or to all units. Access is easier to implement than in mixed access schemes.

According to a third alternative, it is possible before counting up or down to communicate that one part of the units shall only send data and another part of the units shall assign data. Furthermore, the units that have to be read and the units that shall write data may be specified by a separate block write command to the units involved or to all units. The implementation may be more sophisticated compared to the first alternative and to the second alternative. However, there may be applications that prefer the mixed scheme, for instance in applications for building installation (heating, ventilation, air conditioning HVAC) or in applications for controlling units within vehicles, whereby these units are connected to sensors and actuators for x-by-wire concepts, i.e. drive by wire, steer by wire etc.

The units may be connected to wires or lines of a bus system. This is a cost efficient connection type compared for instance to a wireless connection. The radiation of electromagnetic waves is low and influences of EMI and noise may be reduced by special kinds of signal transmission and termination of the ends of the bus wires, for instance by using differential data transmission and/or having electronic line terminations. Furthermore, it is possible to use low voltages for signal transmission, for instance below 5 Volt or below 3.3 Volt or even lower. It is possible to use differential signal transmission and/or electronic line termination in serial bus system as well as in parallel bus systems. In parallel bus systems it is possible to use pairs of wires to which differential signal transmission and/or electronic line termination is applied. A serial bus may have only two wires for data transmission. Additionally these wires or a separate pair of wires may be used for power supply of the units.

A parallel bus system may have at least 4, at least 8 or at least 16 bus wires for the transmission of data in parallel. All bus wires may be used for data transmission, i.e. other data than address data.

Alternatively the units may receive data wirelessly and optionally may also send data wirelessly, especially by radio transmission. This allows mobile units in a limited region or immobile units. Transmission via radio is only one possibility. Other possibilities may be light, ultrasonic sound etc.

The comparison may be made by an electronic circuit without using a processor that would process commands of a program. Hardware only solutions may be cheaper and faster compared to processor solutions even if the low price of small processors is considered. Furthermore, all units may be produced using hardware only, i.e. no processors. ASICs (Application Specific Electronic Circuit) are a cost effective solution. Special integrated circuits may be used if demand is high enough. However, software solutions may also be applied, especially if the processor is already there, i.e. it is used for further tasks than for implicit addressing.

The units may be connected to a serial connection of electronic elements, especially resistors or capacitors or resistors and capacitors. The serial connection of electronic elements may be used for the allocation of the identifiers. Each unit may be connected to a different connection between the elements of the serial connection. If the ends of the serial connection or of the chain of electronic elements are set respectively to high potential and low potential for instance, it is possible to detect a voltage drop or a voltage increase along the chain. The potentials may be detected and used to determine the order of the units along the chain. If the order is known, it is possible to assign addresses or identifiers in decreasing or increasing order.

Analog-Digital-Converters may be used for detection of potentials on the chain. Alternatively, cheaper Schmitt-Trigger circuits may be used applying more sophisticated methods. Furthermore, it is possible to take care for errors based on noise, EMI, tolerances of the elements in the chain and tolerances in the detection circuits.

The chain of elements may comprise elements that all have the same value, for instance the same resistance, for instance in a range of given tolerance of for instance 5 percent, 2.5 percent or one percent with regard to a nominal value.

Alternatively, elements having different values may be used, for instance increasing values of an electric characteristic or decreasing values.

Using the chain of electronic elements allows allocation of the identifiers after power on. Programming of fixed addresses is not necessary. The logistics of manufacturing is simple if no programming is used.

Alternatively, the identifiers may be programmed into non-volatile storage units, for instance during manufacturing of the units or during assembling of the units to bus wires/lines. The non-volatile storage units may be ROM (Read Only Memory), PROM (Programmable ROM), EPROM (Erasable PROM), EEPROM (Electrically EPROM) or other kinds of memory. All addresses are allocated before power on. Therefore, no additional time is needed for allocation of addresses after power on.

There are plenty of applications for the proposed implicit addressing method/scheme. The method may be used for one or more of the following applications:

1) for operating an input arrangement, especially a keyboard on a computer, whereby one key switch or push button is connected to a respective unit and preferably also a light source, especially an LED (Light Emitting Diode) or a plurality of LEDs,
2) for operating a light chain, whereby one light source is or a plurality of light sources are connected to a respective unit, especially an LED or a plurality of LEDs, and preferably also one sensing element or a plurality of sensing elements,
3) for operating a two dimensional (2D) display, preferably with the units arranged in a matrix, whereby one light source is or a plurality of light sources are connected to a respective unit, especially an LED or a plurality of LEDs. Displays with high resolution may be feasible. Alternatively cheaper displays with lower resolution may be used for industrial monitoring of production processes, for displays used in sports stadiums or in train and bus stations.
4) for operating a three dimensional (3D) display, preferably with the units arranged in a 3D matrix, whereby one light source is or a plurality of light sources are connected to a respective unit, especially an LED or a plurality of LEDs. Glass substrates or 3D grids made of thin rods may be used for carrying the units. The two dimensional glass substrates may be arranged with distances between adjacent glass substrates, i.e. with spaces that contain no solid material. Alternatively, there may be no gaps between adjacent glass substrates of the stack that is formed.
5) for operating a chain of sensing elements, whereby one sensing element is or a plurality of sensing elements are connected to a respective unit, preferably one or more of a temperature sensor, a pressure sensor, especially for sensing gas pressure or mechanical pressure, a sensor for sensing an electrical potential, a sensor for sensing a magnetic field,
6) for operating a two dimensional (2D) field of sensing elements, preferably with the units arranged in a matrix, whereby one sensing element is or a plurality of sensing elements are connected to a respective unit, preferably one or more of a temperature sensor, a pressure sensor, especially for sensing gas pressure or mechanical pressure, a sensor for sensing an electrical potential, a sensor for sensing a magnetic field,
7) for operating a three dimensional (3D) field of sensing elements, preferably with the units arranged in a matrix, whereby one sensing element is or a plurality of sensing elements are connected to a respective unit, preferably one or more of a temperature sensor, a pressure sensor, especially for sensing gas pressure or mechanical pressure, a sensor for sensing an electrical potential, a sensor for sensing of magnetic field,
8) for operating a heating and/or ventilation and/or air condition installation, especially within a building, whereby at least one sensor and/or at least one actuating element is connected to a respective unit, especially one of a temperature sensor, a pressure sensor, a smoke sensor, an actuating element for a valve, preferably of a heating element or of a cooling element, an actuating element for a ventilation flap, a switch for a lamp— Existing standards may be further developed using the proposed implicit addressing method, for instance Profibus (Process field bus), EIB (European Installation Bus), KNX (Konnex), ASi (Actuator-Sensor-Interface), etc.
9) for operating the electronic circuits within a vehicle, a ship or an airplane, whereby at least one sensor and/or at least one actuating element is connected to a respective unit, preferably one or more of a sensor of a steering device, a sensor of a device for changing the velocity, a sensor of a device for indicating a change of direction, a sensor that measures a physical entity on a driving unit, preferably on a motor, an actuation element for changing the direction of movement, an actuation element for changing the velocity of movement, an actuation element for displaying a change of the direction of movement.—Existing standards may be further developed using the proposed implicit addressing method, for instance LIN (Local Interconnect Bus), CAN (Controller Area Network), Flexray, PSI5 (Peripheral Sensor Interface 5), etc.

The invention further relates to an electronic group of units, especially for performing a method according to one of the embodiments described above. The group may include at least 10 or at least 100 electronic units, wherein each unit may include (list A):

a first storage unit for storing a unique identifier,
a second storage unit for storing a counter value,
a comparison unit that has inputs that are connected to the first storage unit and to the second storage unit,
a counter unit for counting up or down the counter value, and
an internal control unit for sending data from the respective unit or for receiving and assigning data as data that is dedicated for the respective unit depending on an output signal or on output data of the comparison unit,
whereby the units operate or can operate according to the same method of implicit addressing using the comparison unit and the counter unit.

Another name for the control unit may be bus unit or SLC (Subordinated or SLave Controller). The same technical effects apply that are valid for the method and its embodiments.

The group of units may comprise a super ordinated control unit that transmits command data to the units. Another name for the control unit may be bus control unit or MIC (Master Interface Controller). The units and the control unit are connected or may preferably be connected to the same bus system, especially to a bus system without address lines or wires and especially without using multiplexing of addresses and data. The units may have a super ordinated identifier that identifies the group. The units are preferably connected to a serial connection of electronic elements. With regard to technical effects see the first part of the application.

Furthermore, an electronic unit is proposed, especially for performing a method according to one of the embodiments mentioned above. The unit may comprise the elements that are listed above in list A. The same technical effects apply that are valid for the method and for the group of units and their embodiments.

Furthermore, a control unit is given, especially for performing a method according to one of the embodiments mentioned above. The control unit may include:

a transmitting unit,
an internal control unit that sends sequentially data for different units without intermediate transmission of data with identifiers or with addresses of these units and preferably without the inclusion of address data of these units within the transmitted or sent data, and an optional receiving unit, whereby the receiving unit receives or can receive sequentially data of different units without intermediate transmission of data with identifiers or with addresses of these units and preferably without the inclusion of address data of these units within the received data.

The foregoing has outlined rather broadly the features and technical advantages of embodiments of the present invention in order to understand the detailed description of the invention that follows better. Additional features and advantages of embodiments of the invention will be described hereinafter. These embodiments also form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to implement and use the invention and do not limit the scope of the invention. Moreover, the same reference signs refer to the same technical features if not stated otherwise. As far as "may" is used in this application it means the possibility of doing so as well as the actual technical implementation. As far as "about" is used in this application, it means that also the exact given value is disclosed. The Figures are not drawn to scale, i.e. there may be other dimensions and proportions of the shown elements.

The present invention will be described with respect to the preferred embodiment in a specific context namely an optical output device in the form of an output device with LEDs as output elements. The invention may also be applied, however, to other output arrangements, to input arrangements, for instance to keyboards, or to mixed output/input arrangements, see for instance FIG. 7. Furthermore, the embodiments relate to serial bus systems. Alternatively, it is possible to use parallel bus systems for parallel data transmission but without separate address lines and without using multiplexing of data and address bus between bus units SLC and/or bus control unit MIC. The bus systems may be replaced by wireless connections in other application examples.

Figure 1:
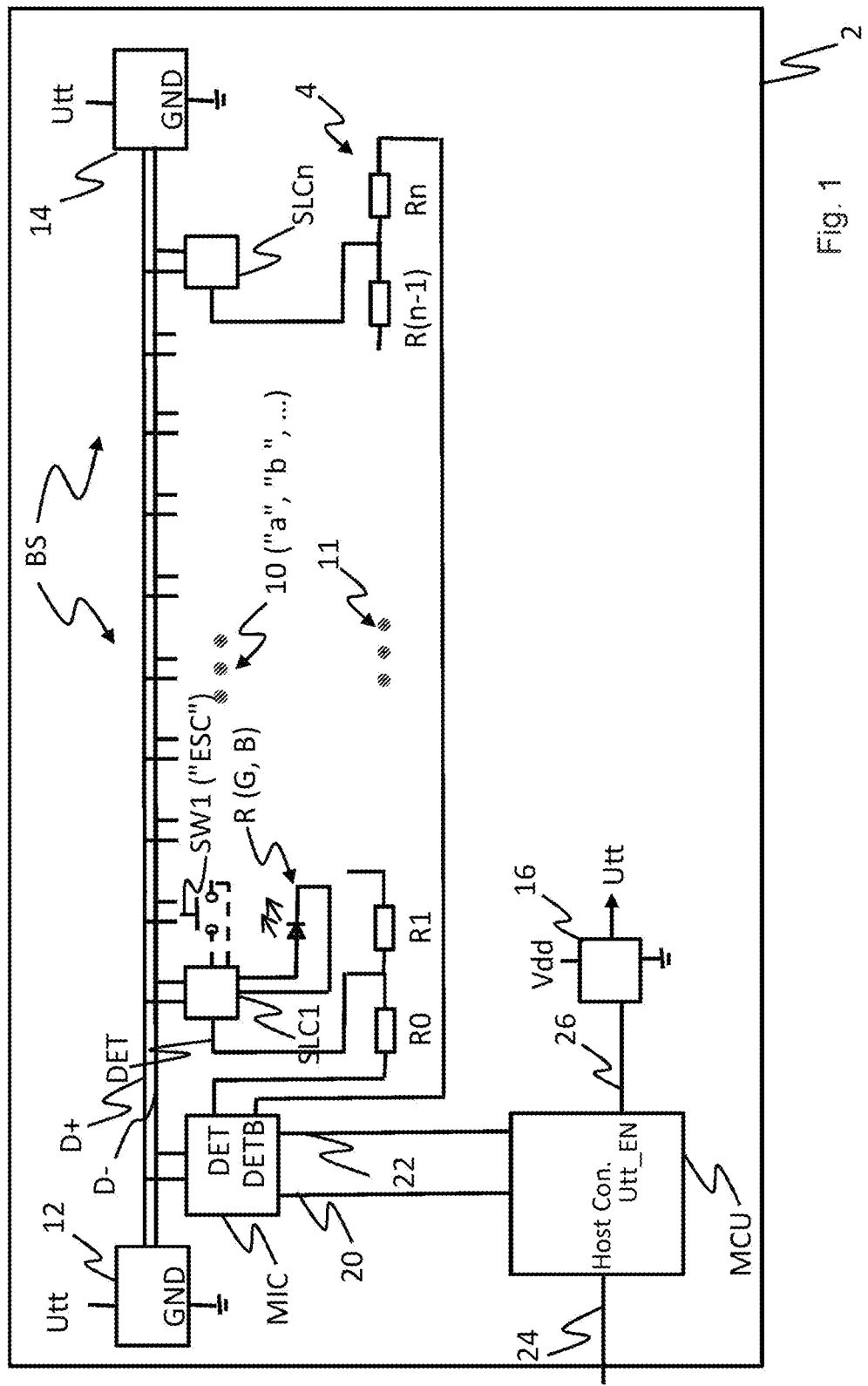
FIG. 1 illustrates a bus topology of a bus system.

FIG. 1 shows a first bus topology of a bus system BS. In the first bus topology there is one bus control unit MIC that is connected with a chain 4 of resistors R0 to Rn all having the same resistive value within the fabrication tolerance. This means that the MIC is able to perform an address allocation method in order to allocate addresses to the SLC after power on.

However there may be a second bus topology where an MCU is connected to chain 4 of resistors R0 to Rn. In this case the MCU controls the allocation of addresses to SLCs. It is possible to have a further tap that goes from the middle of chain 4 to a further input/output pin of the MCU when using the second topology.

A third topology uses one master MIC and several subordinated MICs on bus system BS. This may allow longer bus wires or more SLCs on bus DHIB. The subordinated MICs are also part of chain 4, i.e. their pins DET and DETB are connected to the left or right with resistors.

A fourth topology uses a master MIC and several bridge MICs that are placed between adjacent bus segments of bus system BS and between segments of chain 4. In this topology, line termination units are located at the ends of the wires of the bus of each bus segment. It is possible to have even longer bus systems using bridge MICs.

It is, of course, possible to combine features of the four topologies to get further topologies.

The first bus topology is described in more detail here. The bus system BS is part of an output device 2 that comprises more than 100 LEDs R or G or B or LED groups R, G, B one of them shown on bus unit SLC1. Optionally one switch may be connected to each SLC, see switch SW1 on SLC1 which is for instance the "ESC" (Escape) key, i.e. the output device is also a keyboard according to this option. Although the bus DHIB (Differential Host Interface Bus) of bus system BS is shown along a straight line in FIG. 1 the bus DHIB may change its direction several times in another output device 2 so that there are several parallel sections of bus DHIB, for instance 5 to 7 parallel sections, see FIG. 6.

The resistors R0 bis Rn of chain 4 of resistors are connected in a serial connection beginning with R0, then R1 and so on, see further resistors 11, to the last but not least resistor R(n−1) and to the last resistor Rn. The free end of resistor R0 is connected to a DET output of bus control unit MIC. The free end of resistor Rn is connected to a DETB output of bus control unit MIC. Between two adjacent resistors there are respective taps. The tap between R0 and R1 is connected to bus unit SLC1 input/output pin DET (DETermine). The tap between R1 and R2 is connected to a bus unit SLC2 (not shown, see further bus units 10) and so on. The final tap between resistor R(n−1) and Rn is connected to the last bus unit SLCn on the bus DHIB. The ends of chain 4 may be connected to pins DET, DETB on a bus control unit MIC or on the MCU.

LED groups of three LEDs red R, green G and blue B may be coupled to each bus unit SLC respectively. It is possible to control the LED groups and the LED within one group independently from the LEDs of other groups or of other LEDs within the same group.

The bus system BS includes:
one bus control unit MIC (MIC—Master Interface Controller) in short MIC, bus units SLC1 to SLCn (SLC subordinated or slave controller) in short SLC, for instance between 100 and 200 SLCs or 250 SLCs, and the bus DHIB (Differential Host Interface Bus) in short DHIB.

The bus DHIB comprises two bus wires D+, D−. Bus wire D+ is for the transmission of the logical positive signal, i.e. it signals a logical 1 with positive potential. Bus wire D− is for the transmission of the negative (logical inverse) signals of the differential signal. The bus units SLC1, 10 to SLCn are conductively connected to the bus wires D+ and D− in parallel connection. This means that all other bus units SLC will still work even if one bus unit SLC does not work properly or does not work at all.

Furthermore, output device 2 comprises a processor unit MCU (Microprocessor Control Unit) or in short MCU. Between the MCU and the bus control unit MIC there is an SPI (Serial Peripheral Interface) bus 20, see FIG. 4 for more details. Furthermore, there are control lines 22 between the MCU and the bus control unit MIC. Control lines 22 are also explained in more detail with regard to FIG. 4 below. There is an interface 24, for instance USB (Universal Serial Bus), Bluetooth etc., between the MCU and a further MCU or/and a main processor of a computer. Interface 24 is used to transmit data that sets output states of output elements of output device 2 from the main processing unit. Optionally, input data from input elements on bus units SLC may be read and sent to the main processor.

There are two bus termination units 12, 14 at the ends of bus DHIB for line termination, i.e. in order to prevent reflection of signals at the end of the wires D+ and D−. Such reflection would interfere with the transmitted signals. A power unit 16 generates the power, i.e. the power potential Utt, for bus termination units 12, 16. The relevant voltage is derived from ground GND potential and positive potential Vdd. There is an enable line 26 from MCU to power unit 16 that enables or disenables power generation for potential Utt, i.e. for the potential that is relevant for the powering of the line termination units 12 and 14. This may be used for energy savings. Due to biasing termination may always use two potentials. While usually the negative one is GND and the positive is Utt there may be applications were it is necessary to move the potentials either further apart (for instance for a very large DHIB) or closer together (for instance for low power tweaking) which both will result in two distinct termination voltages Utt+ and Utt−.

Figure 2:
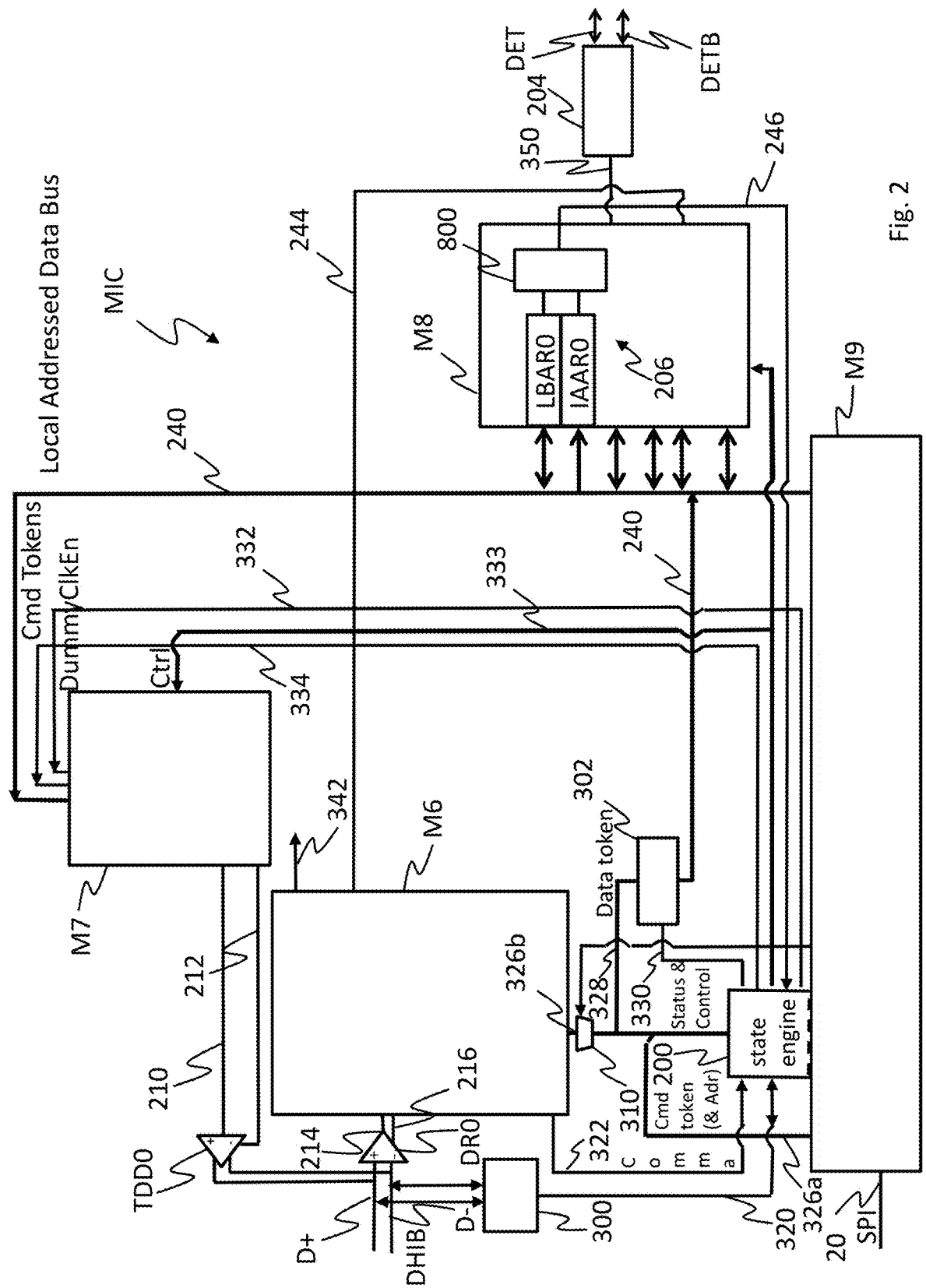
FIG. 2 illustrates sub units of a bus control unit (MIC)
Figure 4:
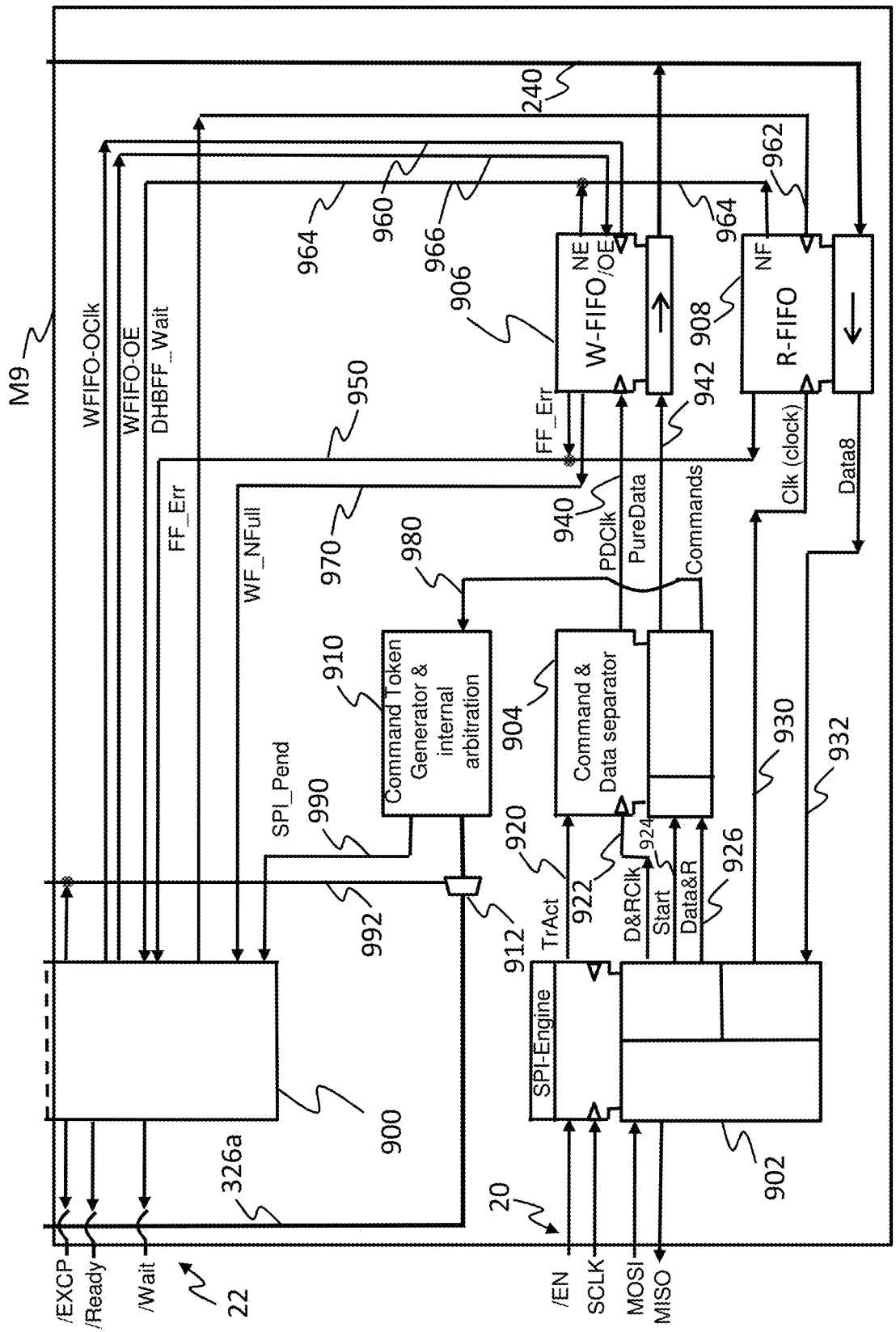
FIG. 4 illustrates sub units of an interface unit within the bus control unit (MIC)

FIG. 2 shows sub units of the bus control unit (MIC):
a state engine 200 of bus control unit MIC that controls the functions of the MIC,
a receiving unit M6 for receiving data and commands from bus DHIB,
a sending/transmitting unit M7 for sending data and commands to the bus DHIB,
a match and general control unit M8 that is used for implicit addressing and for general control,
an interface unit M9 that comprises an interface to and from the processor unit MCU, see FIG. 4 for more details,
a tristate differential driver TDD0 with special state driving (OOB out of band) signaling. The two outputs of TDD0 are connected to bus wires D+ and D−.
a differential receiver DR0 with special state detect. The two inputs of TDD0 are connected to bus wires D+ and D−.
a DET control unit 204 having a first output pin DET that is connected to R0 of chain 4 and a second output pin DETB that is connected to the last resistor Rn of chain 4 enabling the MIC to set the ends of chain 4 to low and high during allocation of addresses to SLCs as described in more detail at the end of the description.
an address and match unit 206 that is used for addressing and that comprises an address register LBAR0 (Local Bus Address Register, address register relevant for bus DHIB) and a counter register IAAR0 (Immanent (upcoming) Address Access Register) as well as a match/compare unit 800. Only the [IAAR] counting may be specific to implicit addressing. The addressing unit as a whole may not be optional, but may be necessary to implement a means of distinguishing the bus stations. Only the IAAR may be definitely optional and LBAR may also be optional, if some sort of "hard wiring" (preprogramming) of the address is used.

There are the following connections between the units of MIC:
data output line 210 for data transmitted to bus DHIB arranged between sending/transmitting unit M7 and input of driver TDD0,
a control line 212 that is between sending/transmitting unit M7 and the control input of driver TDD0,
a data input line 214 for data received from bus DHIB arranged between the output of receiver DR0 and receiving unit M6,
a control line 216 from receiving unit to a control input of receiver DR0,
SPI interface lines 20 between processor unit MCU and interface unit M9, see FIG. 4 for more details,
a local addressed data bus 240 that may comprise a data bus and an address bus separated from each other or multiplexed. Bus 240 is between state engine 200, sending/transmitting unit M7 and match and general control unit M8.
control lines 244 between receiving unit M6 and unit M8,
a match control line 246 between unit M8 and state engine 200 for the signaling of a match of addresses LBAR0, IAAB0 in match unit 800.

Furthermore, bus control unit MIC comprises:
an exception signaling unit 300 having two inputs connected to bus DHIB and being able to detect or to initiate out of band signaling (OOB),
a data buffer register 302 for intermediate storing of data tokens received via bus DHIB,
a bus gate unit 310 for enabling data transfer from receiving unit M6, received token bus 326*b*, to command token and address bus 326*a* between either receiving unit M6 or command token generator (CTG) unit and internal arbitration unit 900 which is part of interface unit M9 and state engine 200, i.e. for preventing transmission conflicts. This is an enable gate unit 310. The other source of command tokens is the Command Token Generator (CTG, 900) under control of the SPI engine 902. The state engine 200 is a pure sink for the commands, i.e. a mere execution unit. Nevertheless state engine 200 selects the source to obtain the next command queued in from: If a command from SPI engine 902 is pending state engine 200 selects CTG (900) as source and on demand even can actively terminate the present command to execute the one from the SPI engine 902. In most modern FPGA (Field Programmable Gate Array) and ASIC (Application Specific Integrated Circuit) implementations "busses" may not be implemented by separate transceivers for each source, but by a multiplexer which may intrinsically prevent conflicts.

a bidirectional signaling line 320 between exception signaling unit 300 and state engine 200. For easier implementation this may be a three line point to point bus, not just one line:

Enable (exception out) signal to the OOB (out of band—signaling) driver, i.e. exception signaling unit 300, OOB signal state indicator (exception in) to the state engine 200, and OOB data line (bidir).

a comma or separator signaling line 322 from receiving unit M6 to state engine 200, the command token and address bus 326a for the transmission of command tokens from receiving unit M6 or the command token generator (CTG) unit and internal arbitration unit 900 to the state engine 902.

the received token bus 326b for the transmission of received tokens from interface unit M9 to state engine 200 and of data and address tokens from receiving unit M6 via data buffer register 302 to local addressed data bus. Any token may consist of 8 bit and may be flagged by a ninth one either as data or as command. An address token thereby may be a data token that due to the preceding command is going to be interpreted as an address or as extension of a command (flags, etc.) by "addressing" a sub-command. Thereby addresses may mainly be handled by the data paths. They may just be interpreted differently due to the control exerted by the state engine. Therefore most address tokens may just be transferred to the [IAAR] or another address related register.

a data token bus 328 for the transmission of data tokens from receiving unit M6 via data buffer register 302 to local addressed data bus 240. This data token bus 328 may also be a branch of received token bus 326b rather than command token and address bus 326a since on this bus data tokens which are not being interpreted as command extension only can originate in receiving unit M6. This may be determined by implementation needs.

status and control line(s) 330 between state engine 200 and data buffer register 302, a dummy clock enable line 332 from state engine 200 to sending/transmitting unit M7 for controlling the generation of dummy clock data on bus DHIB, control lines 333 from state engine 200 to sending/transmitting unit M7 and match and general control unit M8 for general control purposes, a command token bus line 334 from state engine 200 to sending/transmitting unit M7 for the transmission of command tokens that shall be transmitted via bus DHIB to the SLCs, a synchronization clock line 342 that transmits a clock signal to other units of MIC especially while receiving data via bus DHIB. The clock signal is generated inside receiving unit M6.

a bus line 350 between match and general control unit M8 and DET control unit 204 for transmitting data that sets high or low state at the DET and DETB pins of control unit 204.

Figure 3:
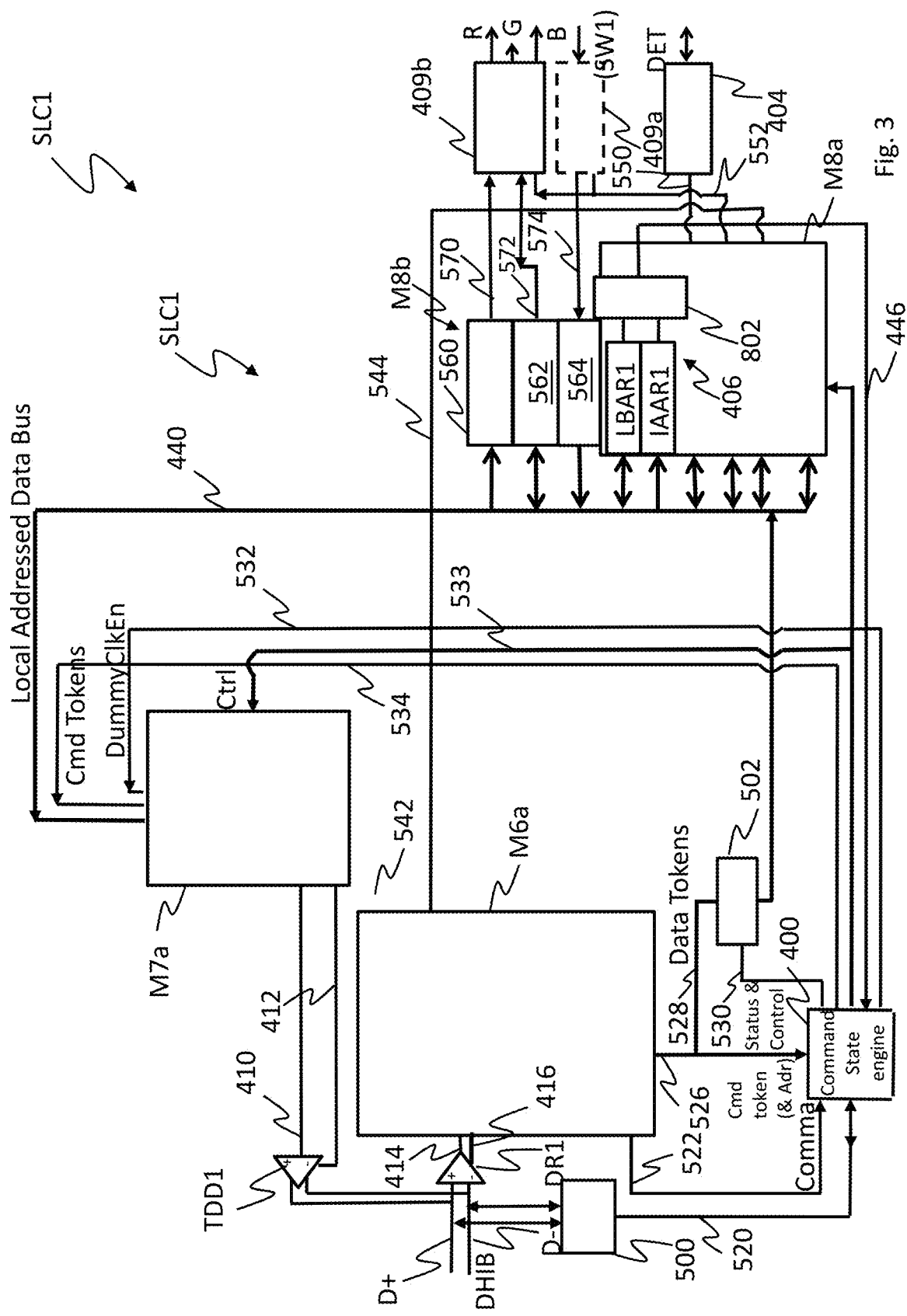
FIG. 3 illustrates sub units of a bus unit (SLC)

FIG. 3 shows sub units of a bus unit (SLC), for instance of SLC1. There are the following similarities between the MIC shown in FIG. 2 and the SLC1 shown in FIG. 3. With regard to the connection of these elements reference is made to the respective elements that have been described with regard to FIG. 2 above. The corresponding elements are shown in round brackets: state engine 400 (SLC) (200 MIC), receiving unit M6a (M6), transmitting unit M7a (M7), match and general control unit M8a (M8), DET control unit 404 (204), address and match unit 406 (206), address register LBAR1 (LBAR0), counter register IAAR1 (IAAR0), match unit 802 (800), tristate differential driver TDD1 (with special state driving) (TDD0), differential receiver DR1 (with special state detect) (DR0), data output line 410 (to bus) (210), control line 412 (212), data input line 414 (from bus) (214), control line 416 (216), local addressed data bus 440 (data bus and address bus separate or multiplexed) (240), match control line 446 (246), exception signaling unit 500 (300), data buffer register 502 (302), signaling line 520 (320), comma signaling line 522 (322), data token bus 528 (328), status and control line 530 (330), dummy clock enable line 532 (332), control lines 533 (333), command token line 534 (334), synchronization clock line 542 (342), connection lines 550 (350).

There are the following differences:

address registers LBAR1 to LBARn and counter registers IAAR1 to IAARn are mandatory in SLCs, the DET control unit 404 does not have a second input/output pin, i.e. DETB, an optional switch sample unit 409a that is coupled to key switch SW1 and that determines how deep key switch SW1 is pressed down, an LED control engine 409b that is coupled to one, two or three LEDs, i.e. a red one R, a green one G and a blue one B, or to more than three LEDs, a command token and address bus 526 between receiving unit M6a and state engine 400. There is no bus gate unit in the SLC corresponding to bus gate unit 310. Furthermore, there is no bus that corresponds to bus 326a because there is no interface unit M9 in SLCs.

connection lines 552 from unit M8a to switch sample unit 409a and to LED control engine 409. It is for instance possible to transmit the state of control flags via lines 552.

Furthermore, there is a second part M8b of match and general control unit M8 of SLC, SLC1 comprising:

a register 560 (ILPCDR—Intermediate LED (light emitting diode) PWM control register) for controlling PWM (pulse width modulation) of the LEDs R, G and B, a register 562 (ILDCDR and LSTAT—Intermediate LED dot correction control register and LED status register) for controlling further functions of the LEDs, i.e. bin correction, on/off etc., and an optional register 564 (ISSOR—Intermediate switch sample output register) that stores the sample value that is sampled from switch SW1 for instance using an ADC.

There is a connection line 570 between register 560 and LED control engine 409b. A further connection line 572 is between register 562 and LED control engine 409b. A third optional connection line 574 is between register 564 and switch sample unit 409a. All three registers 560, 562 and 564 are also connected to local addressed data bus 440, i.e. register 560 for write access, register 562 for read or write access and register 560 for read access. Further registers DCR0 to DCR3 of match and general control unit M8a and M8b will be described below.

The receiving unit M6, M6a may include:

an edge detector and filter unit that receives its input from receiver DR0 or DR1, a clock recuperation and synchronization unit that may receive its input from the edge detector and filter unit, a phase alignment unit that may receive input from receiver DR0 or DR1 and from clock recuperation and synchronization unit, a 10 bit shifter unit that may be coupled to the phase alignment unit, a history buffer that may store the previously received symbol, a modified 8b/10b decoder, the optional modifications may be made with regard to a decoder as described in the article of A. X. Widmer, Peter A. Franaszek, "A DC-Balanced, Partitioned-Block, 8B/10B Transmission Code", IBM J. RES. DEVELOP., Vol. 27, No. 5 Sep. 1983, pp. 440 to 451, and in the literature listed at the end of this article. Some of the modifications will be explained below in more detail. The modified 8b/10b decoder may receive its input from the 10 bit shifter and from the history buffer.

a comma detection unit that detects the comma separator of the frames transmitted on bus DHIB and signals its presence to the respective state engine 200 or 400. The comma detection unit may be closely coupled to the modified 8b/10b decoder.

a command detection unit for detecting commands that have been transmitted via bus DHIB.

An output of the clock recuperation and synchronization unit may output a synchronization clock on line 342 or 542 for other units of the MIC or SLC. Furthermore clock recuperation and synchronization units may be coupled to control lines 244 (544). The command detection unit may be coupled to received token bus 326b (526).

The transmitting unit M7, M7a may include:

a data out buffer and special code insertion unit, an out FIFO unit that may store 4 tokens for example and that receives its inputs from the data out buffer and special code insertion unit, a modified or not modified 8b/10b encoder unit that receives its input from the out FIFO unit, and a 10b (bit) output shifter unit that receives its input from the modified 8b/10b encoder.

The local addressed data bus 240 or 440 is connected to the input of data out buffer and special code insertion unit which also receives command tokens via command token line(s) 332 respectively 532. Dummy clock enable line 332 is also connected with data out buffer and special code insertion unit. The output of the 10b output shifter unit is connected with the input of driver TDD0 or TDD1. All units except the FIFO unit are controlled by the control lines 333.

The match and general control unit M8 comprises the registers that are mentioned in the following in addition to the registers LBAR0 (Local Bus Address Register, address register) and IAAR0 (Imminent Access Address Register, counter register) as well as the match unit 800. The match and general control unit M8a also comprises the registers that are mentioned in the following in addition to the registers LBAR1 (Local Bus Address Register) and IAAR1 (Imminent Access Address Register, counter register) as well as the match unit 802:

register DCR0 that has a bidirectional connection to DET (Determine) control unit 204 or to DET control unit 404, register DCR1 that is connected with lines 552 in unit M8a. These may be several lines carrying the control bits from [DCR1]: enable, mode bits, test flags, etc.

register DCR2 that is connected with control lines 244, 544, and register DCR3 that may be used for other purposes.

Local addressed data bus 240, 440 is connected bidirectional, i.e. for sending and receiving, to all four registers DCR0 to DCR3 in both units M8 and M8a. Control lines 244, 544 may carry control bits, mostly clock mode controls, from DCR2 to receiving unit M6 and M6a and allow the read back of some status bits from the receiving unit M6, M6a.

FIG. 4 shows sub units of an interface unit M9 within the bus control unit (MIC). The interface unit M9 includes:

a second part 900 of state machine/engine of bus control unit MIC, an SPI (Serial Peripheral Interface) engine 902 that is available in the market, a command and data separator unit 904, an input FIFO 906 (write W-FIFO—First In First Out)

an output FIFO 908 (read R-FIFO), a command token generator (CTG) unit and internal arbitration unit 910 creating internal command tokens to be executed by the state machine 200 upon receiving a transfer from SPI engine 902 for the DHIB or for local register access. Some very basic commands may be directly processed by the CTG by arbitrating internal control lines, for example "hard" resetting the chip. Since the state engine 902 is built for processing DHIB commands, any command coming in via SPI engine 902 may translated into an appropriate local command token, which will be executed the normal way by the state engine 200, like in an SLC. In order to distinguish those locally created tokens from those received via the DHIB tokens may be used that have no legal symbol encoding on the DHIB, but nevertheless share most of the bit pattern with their functional DHIB equivalent. In execution there is no difference except of the data flow: Commands transferring data to DHIB may use the W-FIFO as data source instead of the register file of M8, while commands transferring data from DHIB may use the R-FIFO instead of the register file. Local transfers (between local register file and the SPI engine 902 may replace receiving unit M6 and sending/transmitting unit M7 by the appropriate FIFO. However, a few commands may not fit into this scheme like "RESET", local power down and unlocking setup bits that in their present state are explicitly protected from changing by a DHIB access. These commands may be directly executed by the CTG by directly arbitrating the appropriate control lines.

a bus gate 912 between the output of unit 910 and command token and address bus 326a, an exception output line/EXCP as part of control lines 22, a "ready" output line/Ready as part of control lines 22 a "wait" output line/Wait as part of control lines 22 an "enable" input line/EN as part of the standard SPI interface 20, a clock line SCLK as part of the standard SPI interface 20, an input line MOSI as part of the standard SPI interface 20, an output line MISO as part of the standard SPI interface 20, a transaction indicator line 920 between SPI engine 902 and unit 904 indicating a continuous transaction, a clock line 922 between SPI engine 902 and unit 904, a start signaling line 924 between SPI engine 902 and unit 904, a data line 926 between SPI engine 902 and unit 904, a clock line 930 for R-FIFO 908 between SPI engine 902 and output FIFO 908, a data output line 932 of R-FIFO 908 connected with an input of SPI engine 902, an input clock line 940 of input or W-FIFO 906 coming from command and data separator unit 904, a data input line 942 of input or W-FIFO 906 coming from command and data separator unit 904, an error signaling line 950 (FF_Err) coming from FIFOs 906, 906 and going to the second part 900 of the state engine of the bus control unit MIC signalling an overflow or underflow, an output clock line 960 of W-FIFO 906 going to second part 900 of state engine, an input clock line 962 of R-FIFO 908 coming from second part 900 of state engine, a bus wait line 964 coming from output NE (Nearly Empty) of input FIFO 906 and from output NF (Nearly Full) of output FIFO 908 and connected to second part 900 of state machine, i.e. forming a signal DHIBFF_Wait. In FIG. 4, these lines are shown as a "wire or" which may not be available in modern chips any more. So the creation of DHIBFF_Wait probably may be implemented using a "real" or gate.

an output enable/disable line 966 connected to a respective input of W-FIFO 906 for controlling and synchronizing data output to the local addressed data bus 240, a control line 970 (WFF_NFull) coming from a respective control output of input FIFO 906 and going to the second part 900 of state engine for signaling that input FIFO 906 is nearly full, a command signal line 980 from command and data separator unit 904 to command token unit and internal arbitration unit 910, a control line 990 (SPI_Pend) from unit 910 to second part 900 of state engine 200 for signaling that SPI data has been received, and bus gate control line 992 from second part 900 of state engine 200 to bus gate 912 for opening or closing this electronic gate 912. Bus gate control line 992 is also connected to bus gate 310, see FIG. 2.

Local addressed data bus 240 is also connected with data output of input FIFO 906 and with data input of output FIFO 908.

Alternatively, it is possible to use a parallel bus system in bus system BS for parallel data transmission but without separate address lines and without using multiplexing of data and address bus between bus units SLC and/or bus control unit MIC. Moreover, the bus system may be replaced by wireless connections in other application examples of implicit addressing, for instance for a light chain or for an input arrangement, especially a keyboard.

Figure 5:
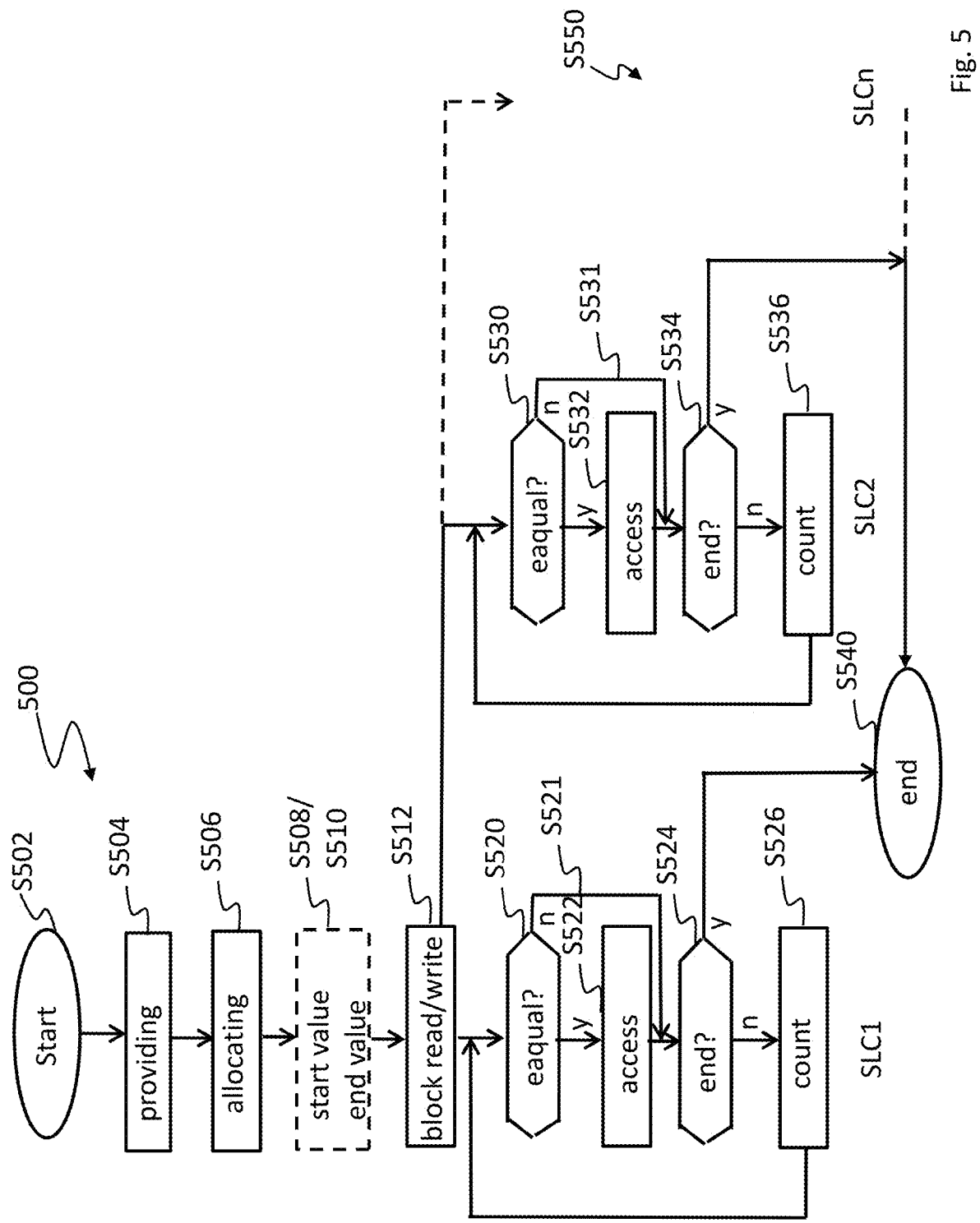
FIG. 5 illustrates a method for implicit addressing.

FIG. 5 illustrates a method 500 for implicit addressing. The method starts in method step S502. There are preparing steps that have to be executed only once, i.e. step S504:

providing S504 within a first unit SLC1 and within a second unit SLC2 respectively a counter unit IAARn, a comparison unit 802 and a storing unit LBARn for the storage of an identifier, i.e. the SLCs have to be produced.

Step S506 is a preparing step that has to be performed only once if programming of the identifiers or addresses is used. Step S506 has to be performed after each power on if flexible address/identifier allocation is used using for instance chain 4 of electronic elements. Examples for this allocation step are described in more detail in the last part of this application, for instance using analogue-digital-converters in SLCs or using Schmitt-trigger-circuits. In the example the following steps are performed:

allocating S506 a first identifier to the first unit SLC1, for instance 1, and allocating S506 a second identifier that is different from the first identifier to the second unit SLC2, for instance 2.

Step S508 has to be performed before each block read access or block write access to several SLCs if not all SLCs should be included within the access, i.e. step S508 is optional. Using for instance a broadcast command the MIC informs the SLC of a start value for the counter registers IAAR. The start value may be zero or one depending on the implementation, i.e. for starting with the first SLC. Alternatively, it is possible to select any other SLC as the first for the next block/bulk access. There are several methods for restricting a bulk access to only a part of the SLCs:

defining a standard value, for instance 10, 20 etc., i.e. 10 SLCs etc. are accessed in bulk access that relates only to a part of the SLCs.

communicating an end value for the counter registers IAAR, see optional Step S510, or communicating a number of SLCs that have to included.

If a mixed block read/write is prepared, it has to be specified from which SLCs data has to be read and to which SLC data has be written. A separate preparation block write access may be used for this purpose, i.e. a write access to all bus units SLC or to only a part of the bus units SLC.

In the example the following steps are performed:

setting S508 the same counter value in the counter units of both units SLC1, SLC2, for instance the value 1.

After step S508/S510 step S512 is performed by the MIC. The bus control unit MIC sends a block read command or a block write command or a mixed read/write command to the SLCs. In an implementation concept the bulk commands may be addressed, i.e. containing the start address meaning the start address has not to be set before and that bulk commands are not broadcasted since all addressed commands (bulk and single) may set the IAAR of all SLCs.

After setting S508 the counter values and after receiving the command, SLC1 and SLC2 perform the following steps:

comparing S520 the counter value in the first unit SLC1 to the first identifier and comparing S530 the counter value in the second unit SLC2 to the second identifier, based on equality (1 equal 1) of the comparison in the first unit SLC1 sending S522 of first data from the first unit in case of a block read command or S522 assigning of first data to the first unit SLC1 in case of a block write command. Data is transmitted via bus DHIB in both cases.

based on inequality (1 unequal 2) S531 of the comparison in the second unit SLC2 no sending of data or assigning of data to the second unit SLC2, after step S522 and S532 each SLC, for instance SLC1 and SLC2 check whether the block access is finished or not, after steps S522 and S532 the counter value within counter register IAAR is counted up S526, S536 or down in both units SLC1, SLC2.

There are several possibilities for implementation of steps S524 and S534:

a flag may be set in the last bus unit of all bus units, i.e. in bus unit SLCn, or alternatively in the last bus unit that is involved in a partly block access. This may be done by the bus control unit MIC during allocation for SLCn, see step S506, or during preparing the block write, comparing current counter value in register IAAR with an end value that was transmitted earlier, counting the number of loops that have performed and comparing this number to a predefined number or to a number that was transmitted earlier.

At the moment it is assumed that the end is not reached yet. The method steps that are performed independently within each SLC are now repeated, i.e. there is a loop of method steps S520 to S526 in SLC1 and of method steps S530 to S536 in SLC2, and in further SLCs, see steps S550.

Within the second loop the following steps are performed:
after the first counting up S526, S536 or down comparing S520 the counter value in the first unit SLC1 to the first identifier and comparing S530 the counter value in the second unit SLC2 to the second identifier,
based on inequality (2 unequal 1) of the comparison in the first unit SLC1 no sending S521 of data from the first unit or S521 no assigning of data to the first unit SLC1,
based on equality (2 equal 2) S531 of the comparison in the second unit SLC2 sending of second data, i.e. as part of a block read access, or assigning of second data as data that is dedicated to the second unit SLC2, i.e. as part of a block read access. Data is transmitted via bus DHIB in both cases.
further counting up S526, S536 or down of the counter value in both units SLC1, SLC2.

The loops of method steps S520 to S526, S530 to S536 are left in step S524, S534, etc. if the end of block access is reached. There may be a flag that is set in all bus units SLC indicating whether the respective bus unit is the last unit with regard to a bulk access. The flag has for instance the value 1 if the respective SLC is the last one. Therefore, it is possible to check this flag in all bus units. If this flag is set and if the bus unit in which this flag is set has already performed the bus access it is clear that the end of bus access is reached. Therefore the last bus unit may inform the other bus units and optionally also the MIC about the end of block access. An implementation may for instance use a RELEASEF message instead of a RELEASE message that has to be used if the flag is not set and if there was a bus access of the unit that checks its flag. RELEASEF may also have the advantage, that the SLCs do not have to find out themselves if the transaction is complete by actively checking for command tokens on the DHIB. So using RELESEF may reduce necessary state engine complexity.

If it is assumed that only the two bus units SLC1 and SLC2 are involved in a block access to only these two units the loops S520 to S526, S530 to S536 are left after the second time. This means that the flag indicating the last unit is set in SLC2 in the example. The method ends therefore in step S540.

Further SLCs may perform the same steps as SLC1 and SLC2, see method steps S550, if more than two SLCs are involved. The number of involved SLCs depends on the kind of block access that is performed, i.e. all SLCs or only a part of the SLCs.

Alternatively, it is possible to use the same method 500 with a parallel bus system for parallel data transmission but without separate address lines and without using multiplexing of data and address bus between bus units SLC and/or bus control unit MIC. The bus system may be replaced by wireless connections in other application examples of the method 500 of implicit addressing.

Figure 6:
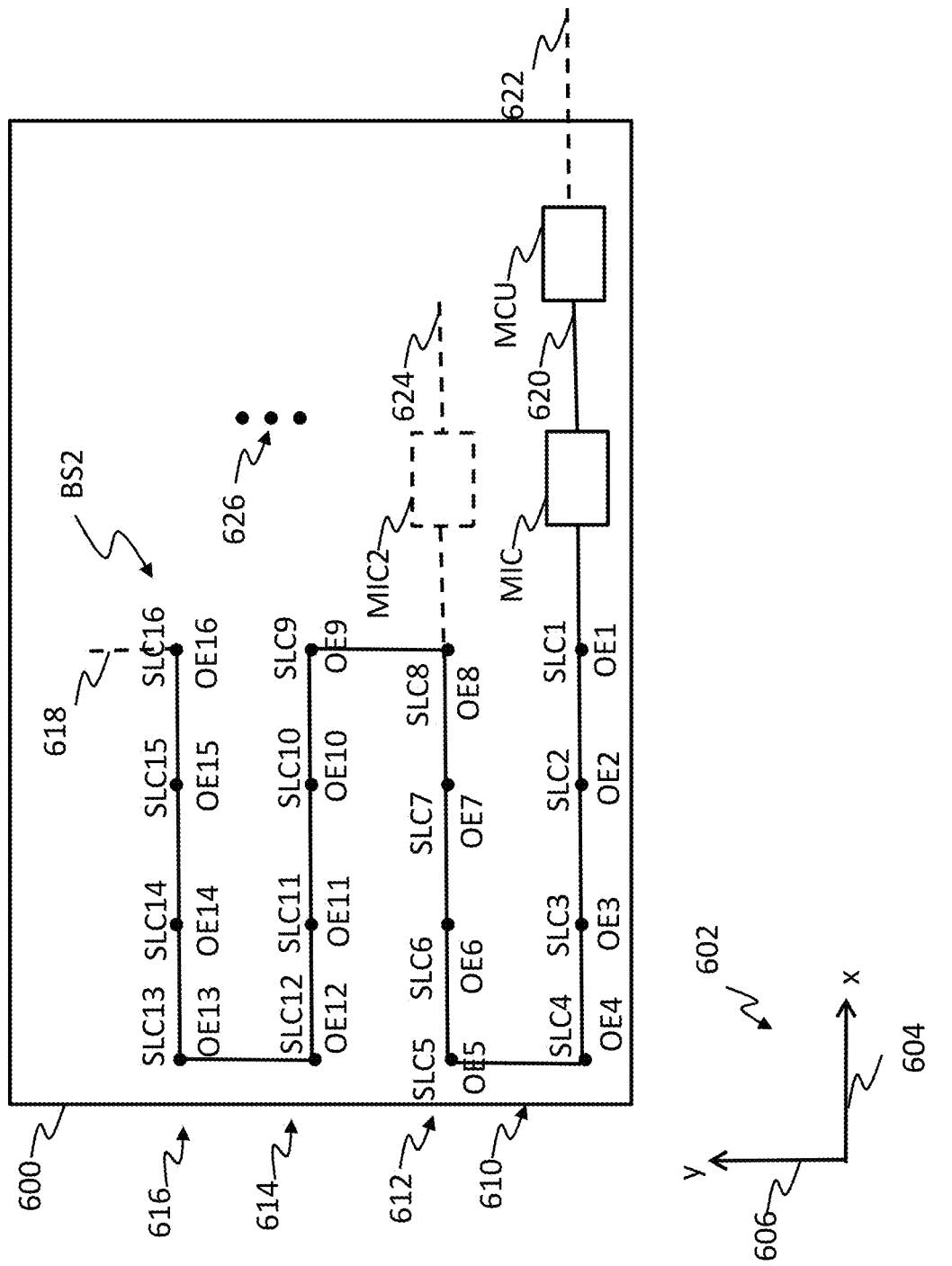
FIG. 6 illustrates a 2D display device.

FIG. 6 illustrates a 2D (two dimensional) display 600. The display 600 comprises a bus system BS2 which is the same as bus system BS described with reference to FIGS. 1 to 4 above. However, no input switches SW1 etc. are used. A Cartesian system of coordinates 602 comprises a horizontal x-axis 604 and a vertical y-axis 606. The bus system BS2 in display 600 has straight sections 610 to 616 extending along the x-axis 604 and each comprising four SLCs. These straight sections 610 to 616 are parallel with regard to each other and are connected by intermediate sections that do not include SLCs. Further sections 618 of bus system BS2 are indicated by dots. Thus, bus system BS2 extends in display 600 in a meandering way within a plane.

In FIG. 6 the following straight sections 610 to 618 are shown:
straight sections 610 including SLC1 to SLC4 (from right to left), i.e. optical output elements OE1 to OE4,
straight sections 612 including SLC5 to SLC8 (from left to right), i.e. optical output elements OE5 to OE8,
straight sections 614 including SLC9 to SLC12 (from right to left), i.e. optical output elements OE9 to OEl12, and
straight sections 616 including SLC13 to SLC16 (from left to right), i.e. optical output elements OE13 to OE16.

There are equal distances between adjacent bus units/ output elements, for instance between OE1 and OE2, OE 2 and OE3, and so on. Alternatively, there may be applications with unequal distances.

However, the 2D display 600 may comprise more than 100, more than one thousand or even more bus units in order to have the resolution that is necessary for the respective application.

Connection lines 620 connect the MIC and the MCU of bus system BS2 within display 600. The MCU may be connected to a local or remote computer system by an interface 622, for instance an USB (Universal Serial Bus), Bluetooth, LAN (Local Area Network), WLAN (Wireless LAN), WIMAX (Worldwide Interoperability for Microwave Access) etc.

Optical output elements OE1 to OE16 etc. comprise only one LED for a monochrome display. Alternatively optical output elements OE1 to OE16 etc. comprise groups of three LEDs, for instance a red R one, green G one and blue B one for a color display. There may also be more than three LEDs in each of the groups.

2D Display 600 may be used to display more static information as in industrial control panels, displays in stadiums, displays in bus or train stations or airports etc. Alternatively, 2D display 600 may be used to display 2D light shows for advertising, for instance. More sophisticated displays 600 may show movies, TV (television) programs, video data, blue ray data etc.

More sophisticated displays 600 may comprise further bus systems 626, for instance for each section 610 to 616 etc. a separate bus system. The first bus system would comprise only the SLCs and OEs of the first straight section 610 in this case, i.e. SLC1 to SLC4 and further SLCs that are not depicted. The second bus system is shown in more detail, i.e. comprising a bus control unit MIC2 that has the same functions as the first bus control unit MIC, see FIGS. 1 and 2 and corresponding description. Connection lines, for instance 624, of further bus systems 626 may be connected to the MCU of the first bus system or to their own MCU. In the last case the MCUs of the bus systems may be connected to a super ordinated MCU. This super ordinated MCU may have an interface to a local or remote computer system. Alternatively, the MCUs of each bus system may have their own interfaces. There may be units that allow synchronization of transmitted data for the case in which several bus systems are used within the same display 600. However this synchronization is optional.

Alternatively, it is possible to use a parallel bus system in display 600 for parallel data transmission but without separate address lines and without using multiplexing of data and address bus between bus units SLC and/or bus control unit MIC. The bus system may be replaced by wireless connections in other display application examples.

There may be applications for 3D displays using a stack of 2D displays. Alternatively, bus system BS2 may extend within several two dimensional planes of a 3D display that are arranged in parallel to the plane that is shown in FIG. 6, i.e. the x-y-plane.

A two dimensional (2D) field of sensors or a three dimensional (3D) field of sensors may be produced correspondingly to a 2D display, for instance 600, or 3D display replacing the optical output elements by sensors and using read commands instead of write commands, especially bulk/block commands.

Figure 7:
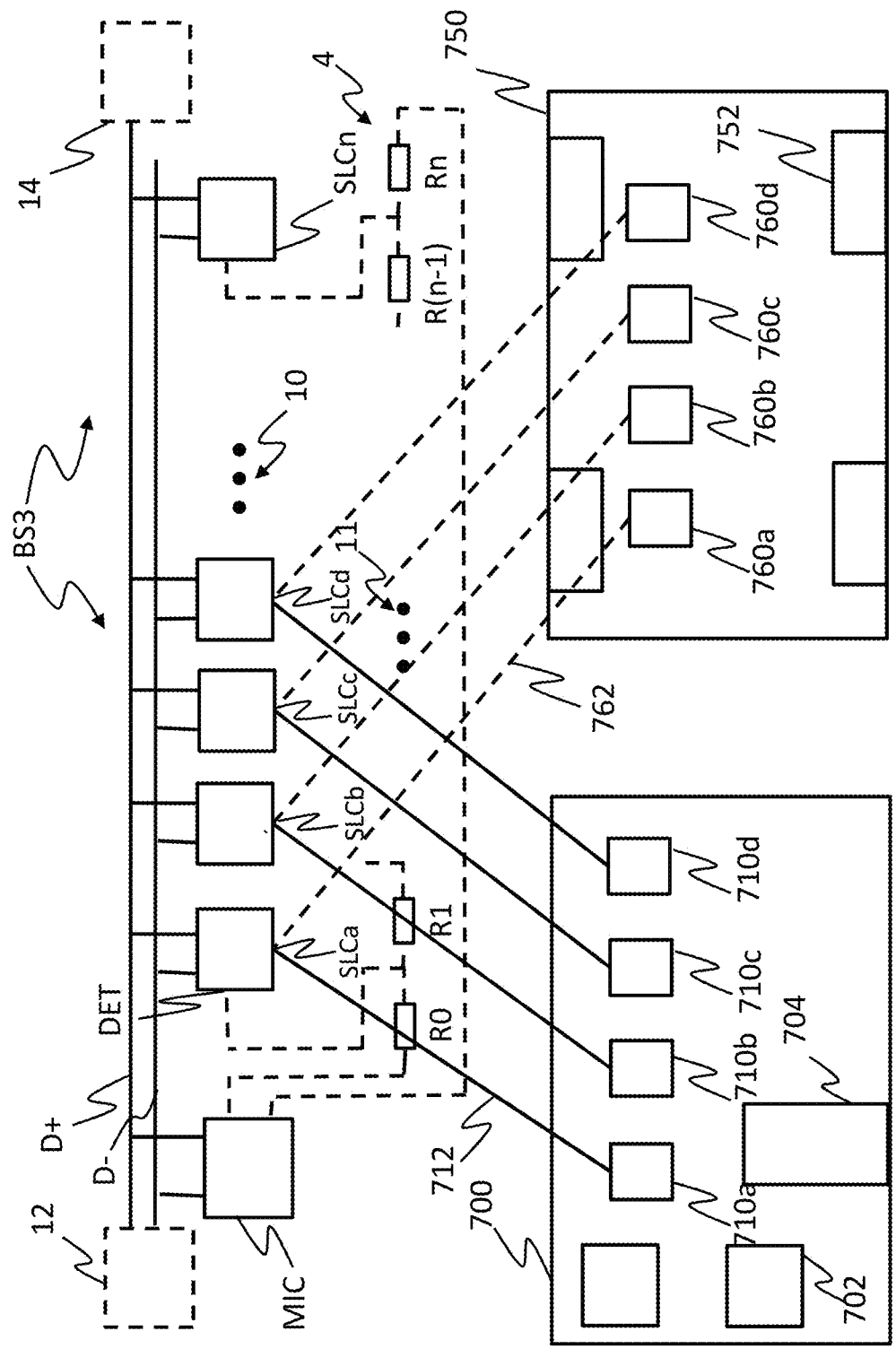
FIG. 7 illustrates a bus system with sensors and actuators.
Figure 8A:
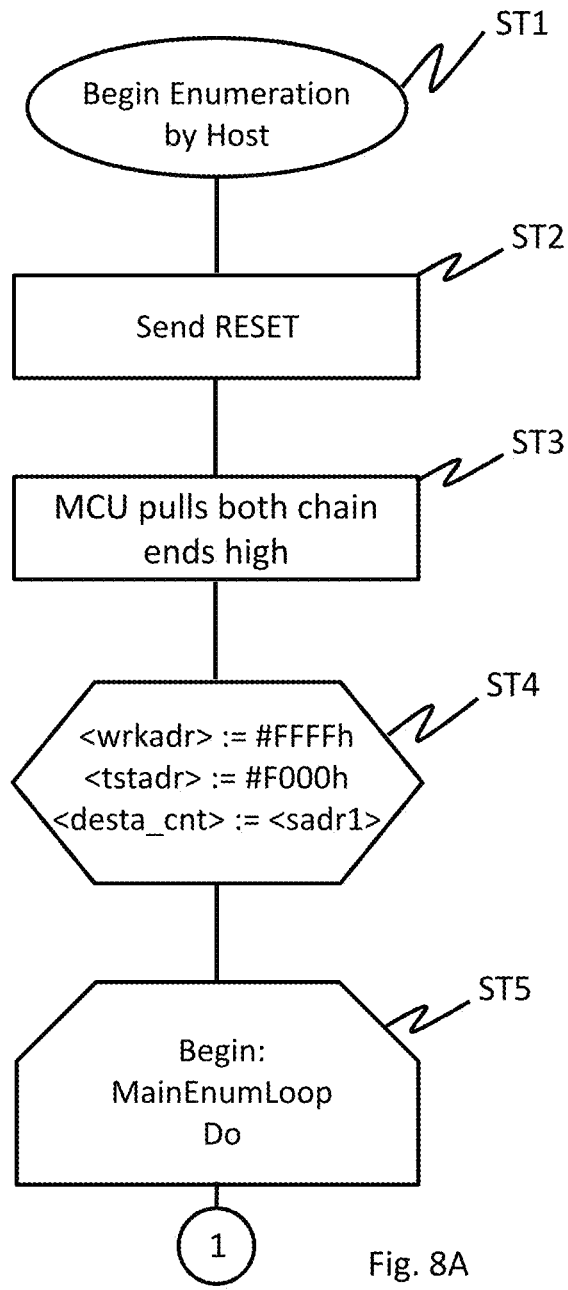
FIGS. 8A to 8E illustrate a process flow for address allocation using Schmitt trigger (ST) circuits within bus units (SLC).
Figure 8B:
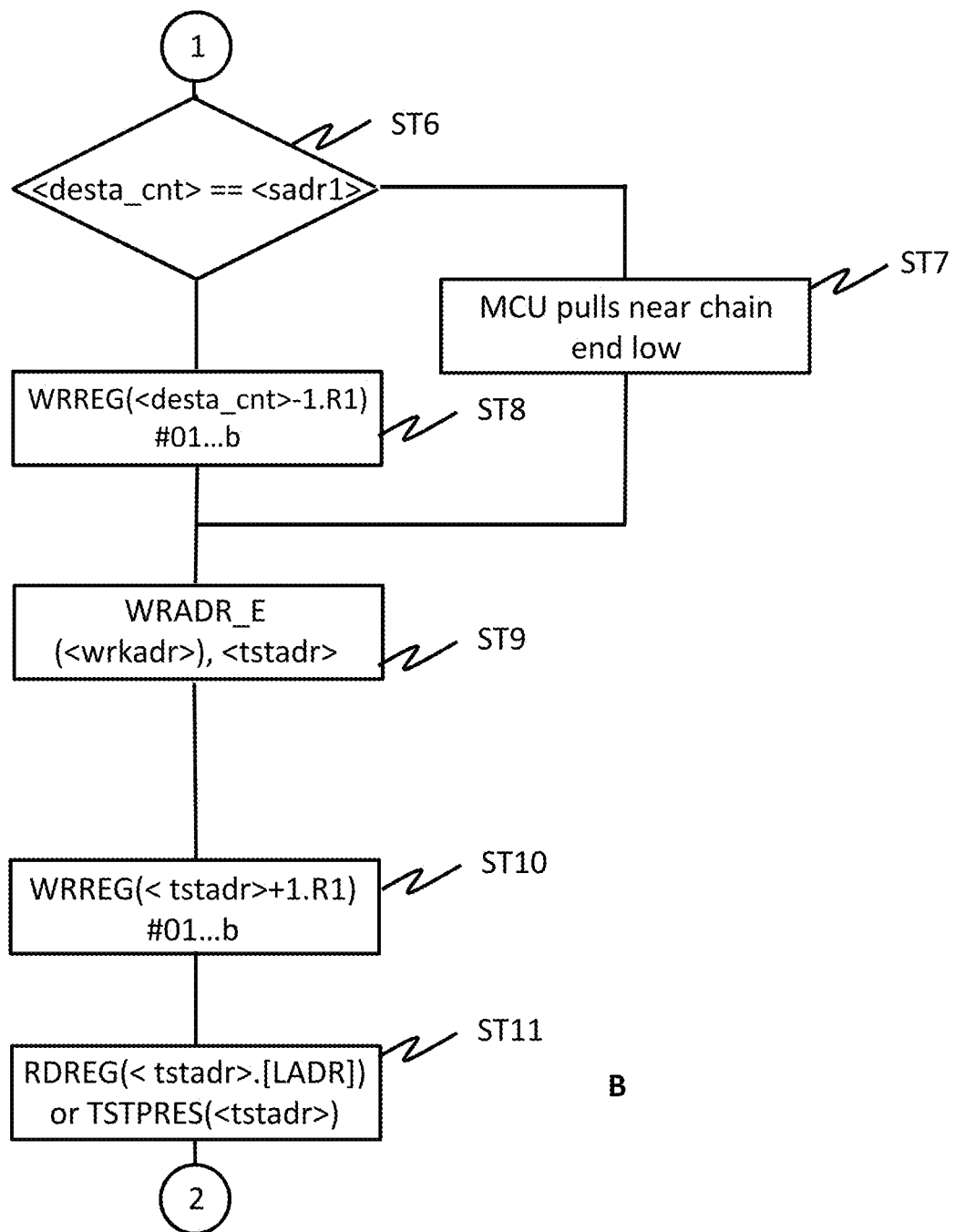
Figure 8C:
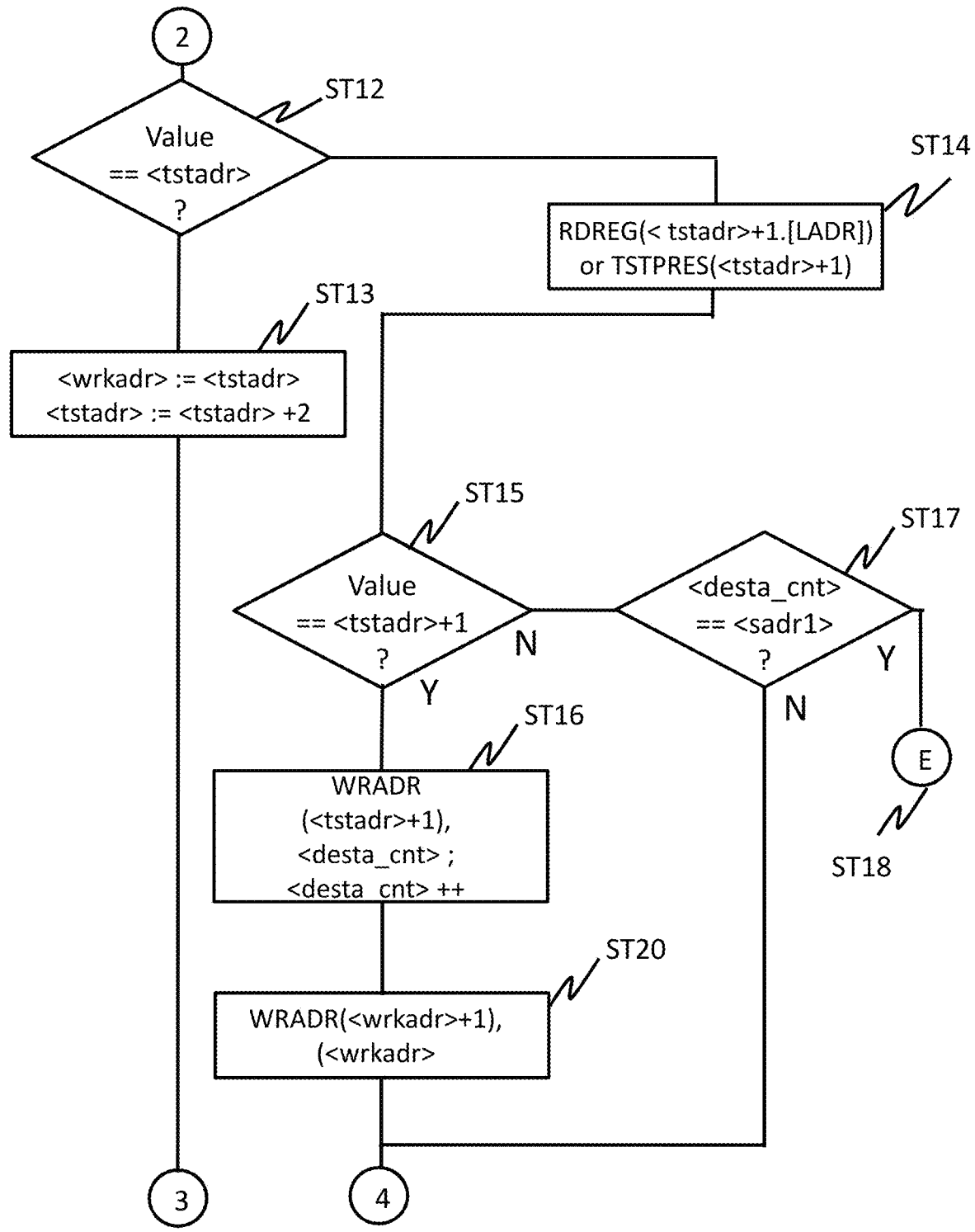
Figure 8D:
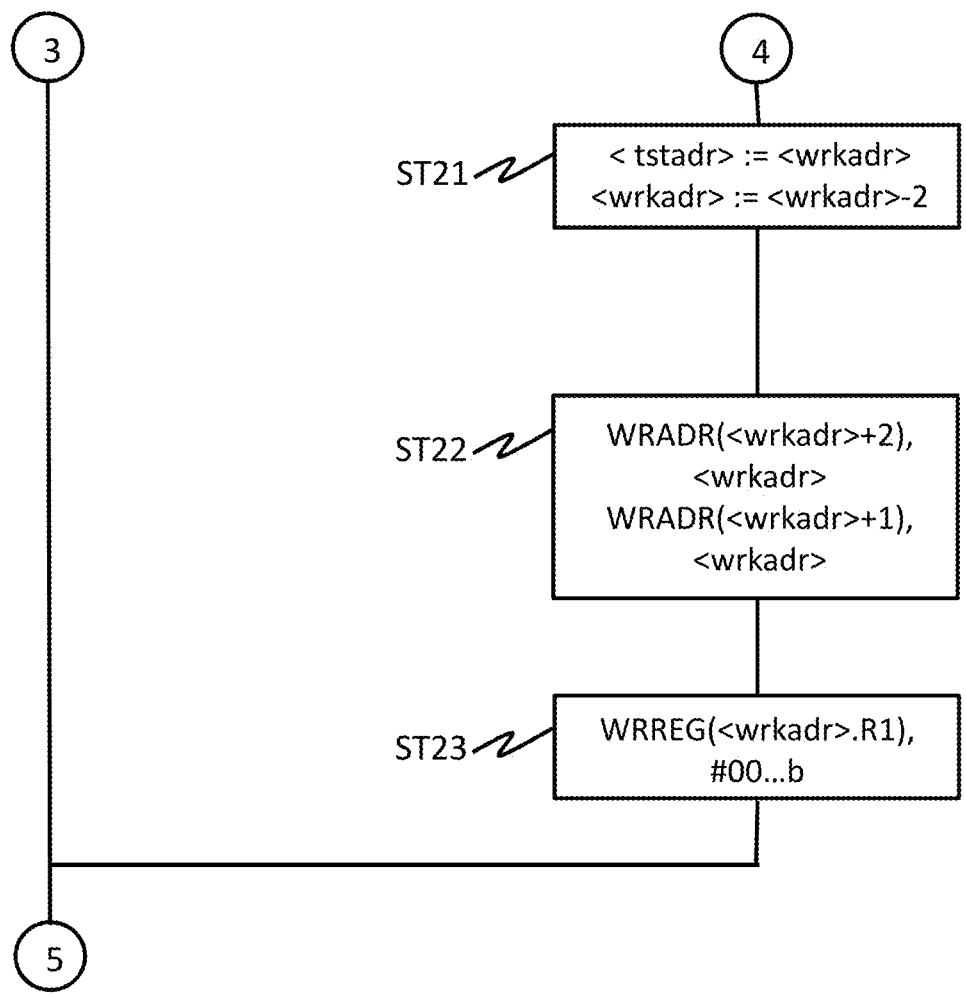
Figure 8E:
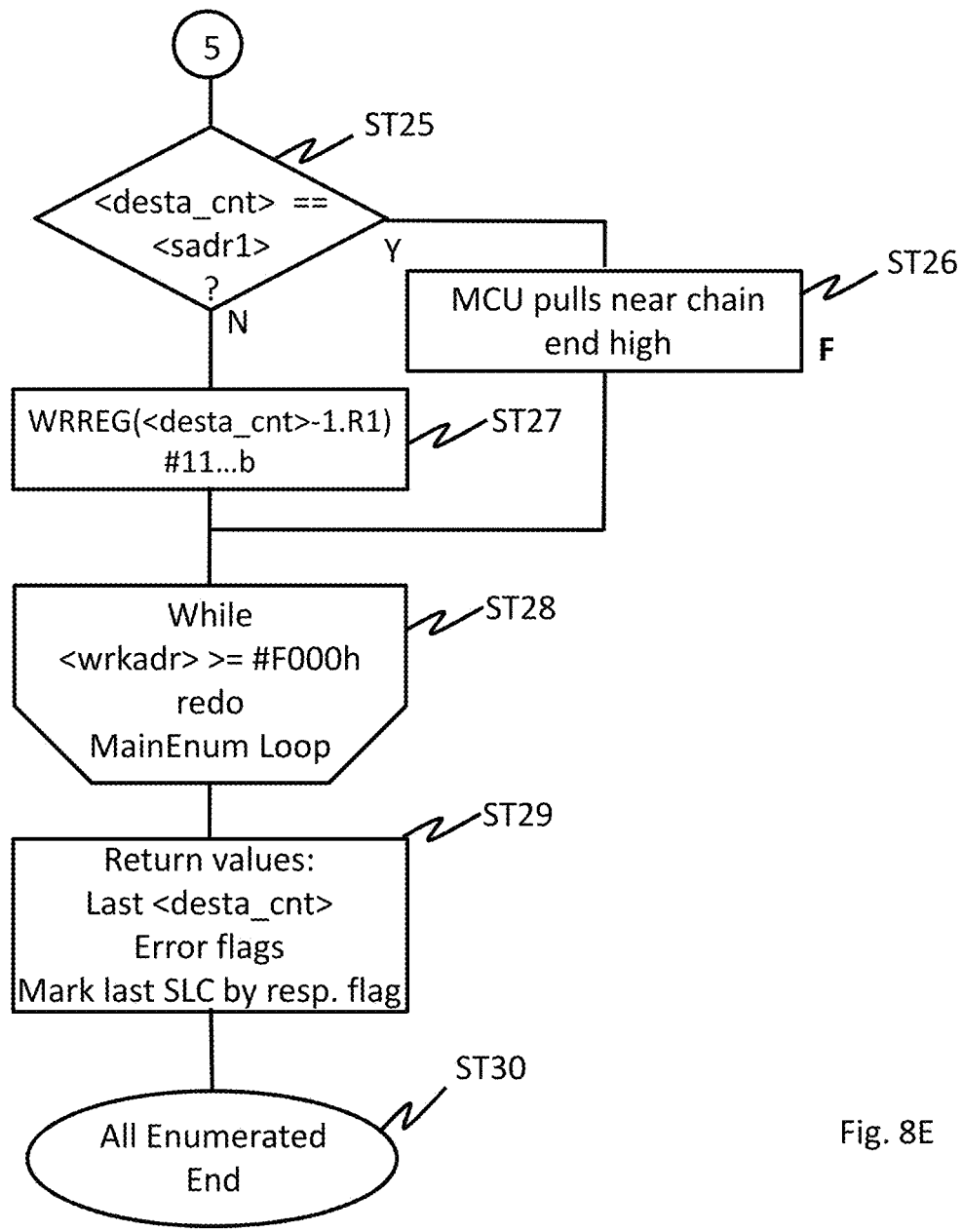

FIG. 7 illustrates a bus system BS3 with sensors and actuators. Bus system BS3 is the same as bus system BS described with reference to FIGS. 1 to 4 above. However, no input switches SW1 or LEDs etc. are used. Line termination units 12, 14 may be optional, for instance for short busses DHIB, as well as chain 4 of electronic elements, especially with nonvolatile addressing.

Bus system BS3 may be part of a heating and/or ventilation and/or air condition installation BS3 within a building 700. However the heating and/or ventilation and/or air condition installation BS3 may also be installed within an airplane, a ship or within a bus or car. The building 700 comprises windows 702 and one or more doors 704. The building may have several floors, for instance between 5 and ten floors or more. Alternatively, building 700 may be a house for a family, e.g. a detached house, a semi-detached house, etc. However, building 700 may also be another type of building, for instance a factory, etc.

Bus system BS3 comprises lots of SLCs, for instance more than 10 or more than 100. Sensor elements and/or actuating elements are connected to respective bus units SLCa to SLCn, for instance:
  a temperature sensor 710*a* is connected to SLCa,
  a smoke sensor 710*b* is connected to SLCb,
  an actuating element 710*c* for a valve of a heating element is connected to SLCc,
  an actuating element 710*d* for a ventilation flap is connected to SLCd,
  a pressure sensor,
  a light sensor, and
  a sensor for measuring the speed of wind at the outside of the building.

A connection 712 is used between bus unit SLCa and sensor 710*a*. There are further connections between the other SLCs, i.e. SLCb, SLCc and SLCd and the sensor 710*b*, the actuator 710*c* and the actuator 710*d* respectively.

A central processor may be part of a control system of building 700. The central processor communicates via the MCU with the MIC of bus system BS3. The control system operates the actuators 710*c*, 710*d* etc. depending on the outputs of the sensors 710*a*, 710*b* etc., e. g. heating elements are controlled using actuator (for instance 710*c*) dependent on outputs of temperature sensors (for instance 710*a*) in the same room as the respective heating element, if smoke is detected (using for instance sensor 710*b*) ventilation flaps (using for instance actuator 710*d*) are closed, etc.

Alternatively, it is possible to use a parallel bus system in building 700 for parallel data transmission but without separate address lines and without using multiplexing of data and address bus between bus units SLC and/or bus control unit MIC. The bus system may be replaced by wireless connections in other building 700 application examples.

Alternatively, bus system BS3 may be used for operating the electronic circuits within a vehicle 750, a ship or an airplane. The vehicle 750 may have four or more wheels 752. The vehicle 750 may be a passenger car, a van, a bus, a truck or another type of vehicle.

Bus system BS3 comprises lots of SLCs, for instance more than 10 or more than 100. Sensor elements and/or actuating elements are connected to respective bus units SLCa to SLCn, for instance:
  a sensor 760*a* of a steering device connected to SLCa,
  a sensor 760*b* of a device for changing the velocity connected to SLCb,
  an actuation element 760*c* for changing the direction of movement connected to SLCc,
  an actuation 760*d* element for changing the velocity of movement connected to SLCd,
  a sensor of a device for indicating a change of direction,
  a sensor that measures a physical entity on a driving unit, preferably on a motor, and
  an actuation element for displaying a change of the direction of movement.

A connection 762 is used between bus unit SLCa and sensor 760*a*. There are further connections between the other SLCs, i.e. SLCb, SLCc and SLCd and the sensor 760*b*, the actuator 760*c* and the actuator 760*d* respectively.

A central processor may be part of a control system of the car. The central processor communicates via the MCU with the MIC of bus system BS3. The control system operates the actuators 760*c*, 760*d* etc. depending on the outputs of the sensors 760*a*, 760*b* etc., e. g. steering, braking, accelerating, etc. There may be a redundant bus system BS3*b* in addition to bus system BS3 within the same vehicle/car 750 as well as a second, redundant central processor for security reasons with regard to the health of the driver and the passengers of the vehicle.

Alternatively, it is possible to use a parallel bus system in vehicle 750 for parallel data transmission but without separate address lines and without using multiplexing of data and address bus between bus units SLC and/or bus control unit MIC. The bus system may be replaced by wireless connections in other vehicle 750 application examples.

The function of bus system BS is described in the following. The following terms are used as synonyms in the following: "station" for bus units SLCs and bus control units MICs connected to the bus DHIB and "block" for the respective unit.

There are for instance the following methods for allocating addresses to bus units SLCs and/or to subordinated bus control units MICs at bus DHIB.

First Method:
  using ADCs within the bus units SLC and/or within the subordinated bus control units MIC and a chain 4 of resistors R0 to Rn,
  pull first end of chain 4 to low and pull second end of chain 2 to high potential,
  sample all taps of chain 4 at the same time, and
  use sample values as part of addresses for the SLCs/subordinated MICs,
  optionally: read all possible addresses and rearrange in order to get address space without gaps.

Second Method:
  same as first method but partitioning of address space is used in order to form partitions that allow sampling of the values on the taps of resistor chain 4 only for a segment/partition. SLCs in previous partition may pull taps to low and SLCs in following partitions may pull taps to high. The resolution of potential values in the respective "middle" partition is improved considerably reducing detection errors and influence of interference. This may be done for all segments/partitions.

Third Method:

same as second method but with using a uniting of two adjacent partitions combined with sampling of values only within the united partition. This may reduce further errors during the allocation of addresses.

Fourth method: using Schmitt Trigger circuits on the taps of chain 4 of resistors R0 to Rn.

Fifth method: Using one of the first to fourth method and storing the addresses that have been allocated in a non-volatile memory for further use after allocation.

Using the process flow shown in FIG. 8A to 8E the allocation goes on as shown in the following table. Z means a high ohmic output state on the DET pins of DET control units 404 of SLCs and subordinated MICs if any. The Schmitt trigger circuits may be centered to half Vdd and may have a range of for instance 0.8 Volt if Vdd is 3.3 Volt for instance. The letters A to D that are shown in FIGS. 8A to 8E are also used in the following table in order to ease the orientation, i.e. the mapping between both kinds of descriptions for the same allocation method. The table has a left part, a middle part and a right part which have to be put together using the same line numeration.

There is a command TSTPRES (<tstadr>) that was not mentioned above but which has the same function as the command RDREG (<tstadr>.[LADR]) that was mentioned above. Basically it replaces the RDREG(<tstadr>.[LADR]) and the subsequent decision must be replaced by a decision like "SLC found ?". The decisions to be replaced are at the end of FIG. 5B (step ST11) and at the upper right of FIG. 5C (step ST14). Step ST14 has to be replaced by TSTPRES (<tstadr>+1). The directly following decision has to be rewritten as "SLC found?", i.e. step ST12 and step ST15.

Register R1 refers to the DET control unit. The left bit stands for the pin value. A write to the DET pin sets the DET pin to the pin value of the left bit. A read to the DET pin reads the external to the left pin. The second bit from left is 1 for output mode and 0 for input mode. If input mode is active, i.e. the second bit is 0 this means that the DET pin is high ohmic connected to chain 4, i.e. state "Z". If the DET pin is in output mode, i.e. the second bit is 1 the DET pin is driven with the value set by the first bit.

x0 (00 or 10): DET pin is in input mode, for instance step ST23, high ohmic, result of input read is 0 if DET pin is pulled high externally and 1 if it is pulled low externally. The output bit value (first bit) is ignored in input mode. A read always directly will read the external value.

01: output zero, for instance step ST8,

11: output one, for instance step ST10, ST27.

The addresses of all SLCs are not shown in every line of the table. In order to ease understanding the addresses are mainly shown if there is a change in addresses.

This is the left part of the table:

| 1 | Command (Symbolic) | Mark | Command/State | Det In | Det Out |
|---|---|---|---|---|---|
| 2 | | | Reset & Ends High | 111111 | ZZZZZZ |
| 3 | | | | | |
| 4 | | A | Near End := Low | 001011 | |
| 5 | WRADR_E (<wrkadr>), <tstadr> | | WRADR_E (#FFFFh), #F000h WRREG (#F001h.Ra), | | |
| 6 | WRREG (<tstadr>+1.R1), #11...b | | #11...b | 011111 | ZZ1Z11 |
| 7 | TSTPRES (<tstadr>) | B | TSTPRES (#F000h) | | |
| 8 | | F | Near End := High | 111111 | ZZ1Z11 |
| 9 | | | | | |
| 10 | | A | Near End := Low | 011111 | ZZ1Z11 |
| 11 | WRADR_E (<wrkadr>), <tstadr> | | WRADR_E (#F000h), #F002h WRREG (#F003h.R1), | | |
| 12 | WRREG (<tstadr>+1.R1), #11...b | | #11...b | 011111 | Z11Z11 |
| 13 | TSTPRES (<tstadr>) | B | TSTPRES (#F002h) | | |
| 14 | | F | Near End := High | 111111 | Z11Z11 |
| 15 | | | | | |
| 16 | | A | Near End := Low | 111111 | Z11Z11 |
| 17 | WRADR_E (<wrkadr>), <tstadr> | | WRADR_E (#F002h), #F004h WRREG (#F005h.R1), | | |
| 18 | WRREG (<tstadr>+1.R1), #11...b | | #11...b | 111111 | 111Z11 |
| 19 | TSTPRES (<tstadr>) | B | TSTPRES (#F004h) | | |
| 20 | TSTPRES (<tstadr>+1) | C | TSTPRES (#F005h) | | |
| 21 | WRADR(<tstadr>+1), <desta_cnt> | | WRADR(#F005h), #0000h | | |
| 22 | WRADR(<wrkadr>+1), <wrkadr> | | WRADR(#F003h), #F002h | | |
| 23 | | | (Rollback shelved) | | |
| 24 | WRADR(<wrkadr>+2), <wrkadr> | | WRADR(#F002h), #F000h | | |
| 25 | WRADR(<wrkadr>+1), <wrkadr> | | WRADR(#F001h), #F000h WRREG (#F000h.R1), | | |
| 26 | WRREG (<wrkadr>.R1), #00...b | | #00...b | 111111 | 1ZZZZZ |
| 27 | | F | Near End := High (1$^{st}$ SLC) | 111111 | 1ZZZZZ |
| 28 | | | | | |
| 29 | | A | Near End := Low (1$^{st}$ SLC) | 000111 | 0ZZZZZ |
| 30 | WRADR_E (<wrkadr>), <tstadr> | | WRADR_E (#F000h), #F002h WRREG (#F003h.R1), | | |
| 31 | WRREG (<tstadr>+1.R1), #11...b | | #11...b | 001111 | 0ZZ111 |
| 32 | TSTPRES (<tstadr>) | B | TSTPRES (#F002h) | | |
| 33 | | F | Near End := High (1$^{st}$ SLC) | 111111 | 0ZZ111 |
| 34 | | | | | |
| 35 | | A | Near End := Low (1$^{st}$ SLC) | 001111 | 0ZZ111 |
| 36 | WRADR_E (<wrkadr>), <tstadr> | | WRADR_E (#F002h), #F004h WRREG (#F005h.R1), | | |
| 37 | WRREG (<tstadr>+1.R1), #11...b | | #11...b | 001111 | 0Z1111 |
| 38 | TSTPRES (<tstadr>) | B | TSTPRES (#F004h) | | |

-continued

| | | | | | | |
|---|---|---|---|---|---|---|
| 39 | | F | Near End := High (1st SLC) | | 111111 | 1Z1111 |
| 40 | | | | | | |
| 41 | | A | Near End := Low (1st SLC) | | 011111 | 0Z1111 |
| 42 | WRADR_E (<wrkadr>), <tstadr> | | WRADR_E (#F004h), #F006h | | | |
| | WRREG (<tstadr>+1.R1), #11...b | | WRREG (#F007h.R1), | | | |
| 43 | | | #11...b | | 001111 | 011111 |
| 44 | TSTPRES (<tstadr>) | B | TSTPRES (#F004h) | | | |
| 45 | TSTPRES (<tstadr>+1) | C | TSTPRES (#F005h) | | | |
| 46 | WRADR(<tstadr>+1), <desta_cnt> | | WRADR(#F007h), #0001h | | | |
| 47 | WRADR(<wrkadr>+1), <wrkadr> | | WRADR(#F005h), #F004h | | | |
| 48 | | | (Rollback to shelved) | | | |
| 49 | WRADR(<wrkadr>+2), <wrkadr> | | WRADR(#F004h), #F002h | | | |
| 50 | WRADR(<wrkadr>+1), <wrkadr> | | WRADR(#F003h), #F002h | | | |
| | | | WRREG (#F002h.R1), | | | |
| 51 | WRREG (<wrkadr>.R1), #00...b | | #00...b | | 000111 | 01ZZZZ |
| 52 | | F | Near End := High (2nd SLC) | | 011111 | 01ZZZZ |
| 53 | | | | | | |

This is the middle part of the table:

| | Adr(SLC1) | Adr(SLC2) | Adr(SLC3) | Adr(SLC4) | Adr(SLC5) | Adr(SLC6) |
|---|---|---|---|---|---|---|
| 1 | | | | | | |
| 2 | #FFFFh | #FFFFh | #FFFFh | #FFFFh | #FFFFh | #FFFFh |
| 3 | | | | | | |
| 4 | #FFFFh | #FFFFh | #FFFFh | #FFFFh | #FFFFh | #FFFFh |
| 5 | #F000h | #F000h | #F001h | #F000h | #F001h | #F001h |
| 6 | #F000h | #F000h | #F001h | #F000h | #F001h | #F001h |
| 7 | | | | | | |
| 8 | | | | | | |
| 9 | | | | | | |
| 10 | | | | | | |
| 11 | #F002h | #F003h | #F001h | #F003h | #F001h | #F001h |
| 12 | | | | | | |
| 13 | | | | | | |
| 14 | | | | | | |
| 15 | | | | | | |
| 16 | | | | | | |
| 17 | #F005h | #F003h | #F001h | #F003h | #F001h | #F001h |
| 18 | | | | | | |
| 19 | | | | | | |
| 20 | | | | | | |
| 21 | #0000h | #F003h | #F001h | #F003h | #F001h | #F001h |
| 22 | #0000h | #F002h | #F001h | #F002h | #F001h | #F001h |
| 23 | | | | | | |
| 24 | #0000h | #F000h | #F001h | #F000h | #F001h | #F001h |
| 25 | #0000h | #F000h | #F000h | #F000h | #F000h | #F000h |
| 26 | | | | | | |
| 27 | | | | | | |
| 28 | | | | | | |
| 29 | | | | | | |
| 30 | #0000h | #F002h | #F002h | #F003h | #F003h | #F003h |
| 31 | | | | | | |
| 32 | | | | | | |
| 33 | | | | | | |
| 34 | | | | | | |
| 35 | | | | | | |
| 36 | #0000h | #F004h | #F005h | #F003h | #F003h | #F003h |
| 37 | | | | | | |
| 38 | | | | | | |
| 39 | | | | | | |
| 40 | | | | | | |
| 41 | | | | | | |
| 42 | #0000h | #F007h | #F005h | #F003h | #F003h | #F003h |
| 43 | | | | | | |
| 44 | | | | | | |
| 45 | | | | | | |
| 46 | #0000h | #0001h | #F005h | #F003h | #F003h | #F003h |
| 47 | #0000h | #0001h | #F004h | #F003h | #F003h | #F003h |
| 48 | | | | | | |
| 49 | #0000h | #0001h | #F002h | #F003h | #F003h | #F003h |
| 50 | #0000h | #0001h | #F002h | #F002h | #F002h | #F002h |
| 51 | | | | | | |
| 52 | | | | | | |
| 53 | | | | | | |

And this is the right part of the table:

| | Comment | wrkadr | tstadr | desta_cnt |
|---|---|---|---|---|
| 1 | | #FFFFh | #F000h | #0000h |
| 2 | | | | |
| 3 | | | | |
| 4 | | | | |
| 5 | | | | |
| 6 | | | | |
| 7 | Some SLC with Adr.LSB:=0 ? → Here: Yes | #F000h | #F002h | |
| 8 | | | | |
| 9 | | | | |
| 10 | | | | |
| 11 | | | | |
| 12 | ST of SLC1 still low ! | | | |
| 13 | Some SLC with Adr.LSB:=0 ? → Here: Yes | #F002h | #F004h | |
| 14 | | | | |
| 15 | | | | |
| 16 | With only one SLC in low end portion the Schmitt-T stays high | | | |
| 17 | | | | |
| 18 | | | | |
| 19 | Some SLC with Adr.LSB:=0 ? → Here: No | | | |
| 20 | Some SLC with Adr.LSB:=1 ? → Here: Yes | | | |
| 21 | | | | #0001h |
| 22 | | | | |
| 23 | Rollback to shelved SLCs. Stop and assess, if wrkadr becomes <#F000h | #F000h | #F002h | |
| 24 | | | | |
| 25 | | | | |
| 26 | | | | |
| 27 | | | | |
| 28 | | | | |
| 29 | | | | |
| 30 | | | | |
| 31 | | | | |
| 32 | Some SLC with Adr.LSB:=0 ? → Here: Yes | #F002h | #F004h | |
| 33 | | | | |
| 34 | | | | |
| 35 | | | | |
| 36 | | | | |
| 37 | | | | |
| 38 | Some SLC with Adr.LSB:=0 ? → Here: Yes | #F004h | #F006h | |
| 39 | | | | |
| 40 | | | | |
| 41 | | | | |
| 42 | | | | |
| 43 | | | | |
| 44 | Some SLC with Adr.LSB:=0 ? → Here: No | | | |
| 45 | Some SLC with Adr.LSB:=1 ? → Here: Yes | | | |
| 46 | | | | #0002h |
| 47 | | | | |
| 48 | Rollback to shelved SLCs. Stop and assess, if wrkadr becomes <#F000h | #F002h | #F004h | |
| 49 | | | | |
| 50 | | | | |
| 51 | | | | |
| 52 | | | | |
| 53 | | | | |

The steps are repeated until all SLCs have their final address, i.e. in the example also SLC3 to SLC6. At the end of the procedure some steps may be performed to clear some variables etc.

Using the gist of the shown embodiment for the Schmitt trigger circuits and using the messages and tokens used in this embodiment it is possible for the person skilled in the art to realize also the first three methods for allocating addresses mentioned above without undue burden or effort.

Although embodiments of the present invention and their advantages have been described in detail above, it should be understood that various changes, substitutions and alterations can be made therein without departing from the spirit and scope of the invention as defined by the appended claims. For example, it will be readily understood by those skilled in the art that many of the features, functions, processes and methods described herein may be varied while remaining within the scope of the present invention. Moreover, the scope of the present application is not intended to be limited to the particular embodiments of the system, process, manufacture, method or steps described in the present invention. As one of ordinary skill in the art will readily appreciate from the disclosure of the invention systems, processes, manufacture, methods or steps presently existing or to be developed later that perform substantially the same function or achieve substantially the same result as the corresponding embodiments described herein may be utilized according to the present invention. Accordingly, the appended claims are intended to include within their scope such systems, processes, methods or steps.

It is possible to combine the embodiments of the introduction with each other. Furthermore, it is possible to combine the examples of the description of Figures with each other. Further, it is possible to combine the embodiments of the introduction and the examples of the description of Figures.

The invention claimed is:

1. A method for implicit addressing of electronic units for data transmission, comprising:
    providing within a first unit and within a second unit respectively a counter unit, a comparison unit and a storing unit for the storage of an identifier,
    allocating a first identifier to the first unit,
    allocating a second identifier that is different from the first identifier to the second unit,
    setting the same counter value in the counter units of both units,
    after setting the counter values comparing the counter value in the first unit to the first identifier and comparing the counter value in the second unit to the second identifier,
    based on equality of the comparison in the first unit sending of first data from the first unit or assigning of first data to the first unit,
    based on inequality of the comparison in the second unit no sending of data nor assigning of data to the second unit, and
    counting up or down the counter value in both units.

2. The method according to claim 1, comprising:
    after counting up or down comparing the counter value in the first unit to the first identifier and comparing the counter value in the second unit to the second identifier,
    based on inequality of the comparison in the first unit no sending of data from the first unit or no of data to the first unit,
    based on equality of the comparison in the second unit sending of second data or assigning of second data as data that is dedicated to the second unit, and
    further counting up or down of the counter value in both units.

3. The method according to claim 1, whereby at least 10 units are provided, comprising:
    providing a counter unit, a comparison unit and a storing unit for storing an identifier in all units,
    allocating unique identifiers to all units,
    setting the same counter value in all units,
    whereby at least 20 percent of all units send data or assign data as data that is dedicated to the respective unit without intermediate setting of same counter values for the units,
    and without intermediate transmission of address data to the units or from the units.

4. The method according to claim 3, whereby before counting up or down it is communicated that only one part of the units shall send data or shall assign data, by transmitting an end value for the counter value or by transmitting a data value that gives the number of units that shall send data or that shall assign data.

5. The method according to claim 1, whereby before counting up or down it is communicated that the units shall only send data,
    or whereby before counting up or down it is communicated that the units shall only assign data,
    or whereby before counting up or down it is communicated that one part of the units shall only send data and another part of the units shall assign data.

6. The method according to claim 1, whereby the units are connected to wires or lines of a bus system,
    whereby the bus system is a bus system using sequential or serial transmission of data,
    or whereby the bus system is a bus system having at least 4 bus wires for the transmission of data in parallel, and whereby the units receive data wirelessly and optional also send data wirelessly.

7. The method according to claim 1, whereby the comparison unit is made by an electronic circuit without using a processor that would process commands of a program, whereby the units are electronic circuits without a processor.

8. The method according to claim 1, whereby the units are connected to a serial connection of electronic elements,
    whereby the serial connection of electronic elements is used for the allocation of the identifiers,
    whereby each unit is connected to a different connection between the elements of the serial connection.

9. The method according to claim 1, whereby the identifiers are programmed into non-volatile storage units.

10. The method according to claim 1, whereby the method is used for one or more of the following applications:
    for operating an input arrangement, whereby one key switch or push button is connected to a respective unit and preferably also a light source,
    for operating a light chain, whereby one light source is or a plurality of light sources are connected to a respective unit, and also one sensing element or a plurality of sensing elements,
    for operating a two dimensional display, with the units arranged in a matrix, whereby one light source is or a plurality of light sources are connected to a respective unit,
    for operating a three dimensional display, with the units arranged in a 3D matrix, whereby one light source is or a plurality of light sources are connected to a respective unit,
    for operating a chain of sensing elements, whereby one sensing element is or a plurality of sensing elements are connected to a respective unit, one or more of a temperature sensor, a pressure sensor, a sensor for sensing an electrical potential, and a sensor for sensing of magnetic field,
    for operating a two dimensional field of sensing elements, with the units arranged in a matrix, whereby one sensing element is or a plurality of sensing elements are connected to a respective unit, one or more of a temperature sensor, a pressure sensor, a sensor for sensing an electrical potential, a sensor for sensing a magnetic field,
    for operating a three dimensional field of sensing elements, with the units arranged in a matrix, whereby one sensing element is or a plurality of sensing elements are connected to a respective unit, one or more of a temperature sensor, a pressure sensor, a sensor for sensing an electrical potential, a sensor for sensing a magnetic field,
    for operating a heating and/or ventilation and/or air condition installation, whereby at least one sensor and/or at least one actuating element is connected to a respective unit, of a heating element or of a cooling element, an actuating element for a ventilation flap, a switch for a lamp,
    for operating the electronic circuits within a vehicle, a ship or an airplane, whereby at least one sensor and/or at least one actuating element is connected to a respective unit, one or more of a sensor of a steering device, a sensor of a device for changing the velocity, a sensor of a device for indicating a change of direction, a sensor that measures a physical entity on a driving unit, preferably on a motor or engine, an actuation element for changing the direction of movement, an actuation element for changing the velocity of movement, an actuation element for displaying a change of the direction of movement.

11. An electronic group of units, comprising:
at least 10 units, wherein each unit comprises:
  a first storage unit for storing a unique identifier;
  a second storage unit for storing a counter value;
  a comparison unit that has inputs that are connected to the first storage unit and to the second storage unit;
  a counter unit for counting up or down the counter value; and
  an internal control unit for sending of data from the respective unit or for receiving and assigning of data as data that is dedicated for the respective unit depending on an output signal or on output data of the comparison unit; and
  whereby the units operate or can operate according to a same method of implicit addressing using the comparison unit and the counter unit; and
a super ordinated control unit that transmits command data to the units;
wherein the units and the super ordinated control unit are connected or connected to a same bus system, especially to a bus system without address lines or wires and especially without using multiplexing of addresses and data,
wherein the units have a super ordinated identifier that identifies the group, and wherein the units are connected to a serial connection of electronic elements.

* * * * *